United States Patent [19]

Lange et al.

[11] 4,028,344

[45] June 7, 1977

[54] α-ISOCYANATO AND α-ISOTHIOCYANATO AZOS AND THEIR DERIVATIVES

[75] Inventors: Harold Carl Lange, Grand Island; Ronald Edward MacLeay, Williamsville, both of N.Y.

[73] Assignee: Pennwalt Corporation, Philadelphia, Pa.

[22] Filed: Mar. 21, 1974

[21] Appl. No.: 453,452

[52] U.S. Cl. .............................. 260/174; 260/2.5 N; 260/175; 260/192; 260/870; 260/925; 526/218; 526/219; 526/344

[51] Int. Cl.² .................... C07C 107/02; C08J 9/00

[58] Field of Search .................. 260/192, 174, 175

[56] References Cited

UNITED STATES PATENTS

| | | | |
|---|---|---|---|
| 2,586,995 | 2/1952 | Robertson | 260/192 |
| 3,282,912 | 11/1966 | Benzing | 260/158 |
| 3,644,406 | 2/1972 | Sheppard et al. | 260/192 |
| 3,649,614 | 3/1972 | Sheppard et al. | 260/174 |
| 3,752,802 | 8/1973 | Sheppard et al. | 260/192 |
| 3,775,395 | 11/1973 | Koyanagi et al. | 260/192 |

*Primary Examiner*—Daniel E. Wyman
*Assistant Examiner*—John J. Doll

[57] ABSTRACT

Azoalkanes of the formula

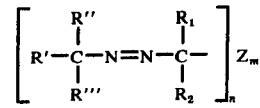

where Z is isocyanate or isothiocyanate or derivatives thereof, such as 1-t-butylazo-1-isothiocyanatocyclohexane, which are useful as foaming agents for polyester resins and as free radical initiators for vinyl monomers.

10 Claims, No Drawings

α-ISOCYANATO AND α-ISOTHIOCYANATO AZOS AND THEIR DERIVATIVES

BACKGROUND

This invention relates to new azoalkanes containing isothiocyanate or isocyanate groups in the α-position to the azo group. The compounds can be symmetrical azoalkanes with isothiocyanate or isocyanate groups in the α and α'-positions, unsymmetrical t-alkyl (where "t" designates tertiary), cycloalkyl and aralkyl azoalkanes containing one isothiocyanate or isocyanate group α to an azo group, and unsymmetrical α-cyanoazoalkanes containing one isothiocyanate or isocyanate group in the α'-position. In addition, this invention relates to the corresponding derivatives of these compounds, for example, by reaction with active hydrogen compounds such as ammonia, amines, alcohols, phenols, thiols, diols, dithiols, diamines, hydrazine derivatives and the like. The compounds are efficient foaming agents for polyester resins.

As far as is now known, no azoalkanes of general structure I hereinbelow have been previously reported, although various patents have disclosed or claimed t-alkyl, cycloalkyl and aralkylazoalkanes containing one α-chloro, α-cyanate or α-thiocyanate group (British Pat. No. 1,272,284), and symmetrical α,α'-dicyanato (or dithiocyanato)-azoalkanes and unsymmetrical α-cyano-α'-cyanato (or thiocyanato)-azoalkanes (U.S. Pat. No. 3,282,912 and Canadian Pat. No. 750,380). Aromatic azos containing α-isocyanato groups are reported in Angew. Chemie., International Ed. Vol. 7, 293-4 (1968).

BRIEF SUMMARY OF THE INVENTION

This invention relates to compounds of the general structure

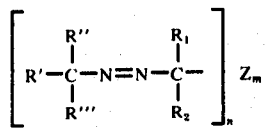

(I)

where:

$n$ is 1 or 2 when $R''' \neq Y$ (" $\neq$ " indicating does not equal) and 1 - 20 when $R'''$ is Y (preferably 1 or 2).

$m$ is 1 (preferred) when $n$ is 1 or 2 and is 2 - 20 when $n$ is greater than 2, and can also be 0 when $n$ is 1, $R'''$ is Y, and Y is a diradical linked to both α-carbons.

$R'$, $R''$ and $R'''$ are separately selected from an alkyl radical of 1 to 8 carbons and an aralkyl radical of 7 to 12 carbons, and $R''$ can be an aryl radical of 6 to 14 carbons. Two or three of $R'$, $R''$ and $R'''$ can also join with the tertiary carbon atom to which they are attached to form a cycloalkyl (mono-, bi-or-tri-) radical 3 - 12 carbons. $R'''$ can also be a cyano group or Y (defined below).

$R_1$ and $R_2$ are separately selected from an alkyl radical of 1 to 8 carbons, a cycloalkyl (mono-, bi- or tri-) radical of 3 to 12 carbons, and an aralkyl radical of 7 to 12 carbons. $R_2$ can also be an aryl radical of 6 to 14 carbons or a five - or six - membered heterocyclic radical. $R_1$ and $R_2$ can join together to form an alkylene diradical of 3 to 11 carbons. One or more of each of $R_1$ and $R_2$ can be substituted with radicals selected from lower alkoxy (lower indicating about 1 to 4 carbons), aryloxy (preferably phenoxy), hydroxy, carboxy, lower alkoxycarbonyl, acyloxy (preferably benzoyloxy), halogen (preferably F, Br or Cl), cyano, amido, lower alkylamido or lower alkylsulfonato.

When $n$ is 1 or 2 and $m$ is 1, Z (when $n=1$) and Y have the same definition and are selected from

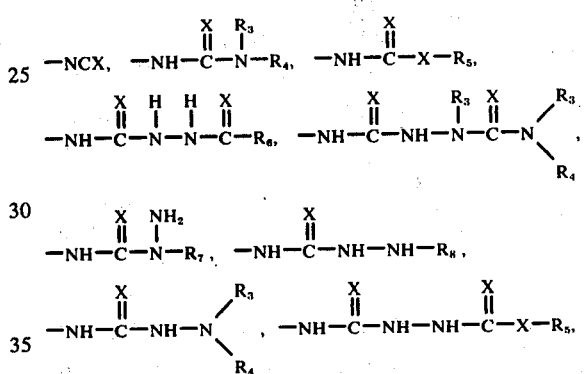

and, when $n=2$, Z is selected from

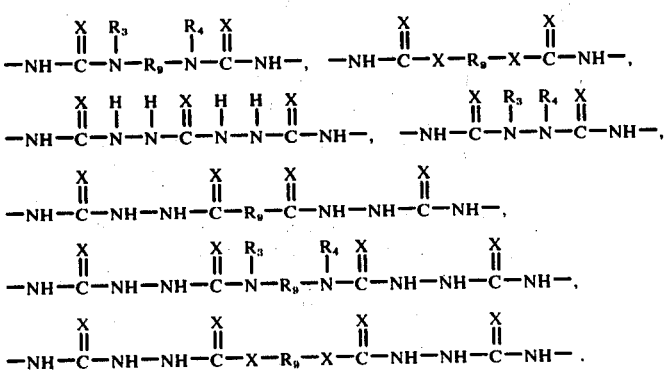

When $n$ and $m$ are both greater than one, Y and Z have the same definition and are selected from the same biradicals listed above for Z (when $n=2$).

When $n$ is 1 and $m$ is 0, Y will also be linked to the t-carbon atom connected to the azo group and is also selected from the same biradicals listed above for Z (when $n=2$).

X is oxygen or sulfur.

$R_3$ and $R_4$ are separately selected from hydrogen, alkyl (or alkenyl) of 1 to 12 carbons, cycloalkyl of 3 to 12 carbons, aralkyl of 7 to 12 carbons, a five- or six-membered heterocyclic radical, and aryl of 6 to 14 carbons. $R_3$ and $R_4$ can also join together to form an alkylene diradical of 3 to 11 carbons. One or more of each of $R_3$ and $R_4$ can be substituted with radicals selected from lower alkoxy, aryloxy (such as phenoxy), hydroxy, carboxy, lower alkoxycarbonyl, acyloxy (such as benzoyloxy), halogen (e.g., Cl, Br, F), cyano or amido.

$R_5$ is alkyl of 1 to 12 carbons, cycloalkyl of 3 to 12 carbons, aralkyl of 7 to 12 carbons, a five- or six-membered heterocyclic radical, or aryl of 6 to 14 carbons, and can be substituted with lower alkoxy, aryloxy (such as phenoxy), hydroxy, carboxy, lower alkoxycarbonyl, acyloxy (e.g., benzoyloxy), halogen (e.g., Cl, Br, F), cyano or amido radicals.

$R_6$ is hydrogen, alkyl of 1 to 8 carbons, cycloalkyl of 3 to 8 carbons, aralkyl of 7 to 12 carbons, or aryl of 6 to 14 carbons, and can be substituted with lower alkoxy, aryloxy (e.g., phenoxy), hydroxy, carboxy, halogen (e.g., Cl, Br), or cyano radicals.

$R_7$ is primary or secondary alkyl of 1 to 12 carbons or cycloalkyl of 3 to 12 carbons, and can be substituted with lower alkoxy, hydroxy, halogen (e.g., Cl) or cyano.

$R_8$ is t-alkyl of 4 to 8 carbons or aryl of 6 to 14 carbons, and, when $R_8$ is aryl, can be substituted with lower alkoxy, hydroxy, halogen (Cl, Br, F, I), or cyano.

$R_9$ is a hydrocarbon diradical of up to 20 carbons selected from aliphatic (preferably 2 – 20 carbons), cycloaliphatic (preferably 3–20 carbons), aromatic-aliphatic (preferably 7–20 carbons) and aliphatic-cycloaliphatic (preferably 4–20 carbons) optionally containing one or more non-adjacent and non-terminal oxygen, sulfur, or nitrogen atoms in the backbone structure, or is an aromatic hydrocarbon diradical of 6–12 carbons.

DETAILED DESCRIPTION OF INVENTION

The novel compounds (I) of this invention are α-substituted or α,α'-disubstituted azoalkanes in which the α-substituent is an isothiocyanate, isocyanate, thiourea, ureido, thiocarbamate or carbamate group.

Preparations

A. Unsymmetrical t-Aliphatic α-Isothiocyanato and α-Isocyanato-Azoalkanes

The t-aliphatic azoalkanes containing one isothiocyanato group (I where Z is —NCS and R''' is not Y) are prepared by reacting the corresponding t-alkyl, cycloalkyl or aralkyl-α-chloroazoalkanes with aqueous alcohol solutions of ammonium or sodium thiocyanate under conditions sufficient to isomerize the initially formed α-thiocyanato intermediate to the corresponding α-isothiocyanate.

The rate of isomerization of the α-thiocyanato-azoalkane varies with the structure of the azo compound (i.e., R', R'', R''', $R_1$ and $R_2$) and in some cases a considerable amount of the α-isothiocyanatoazoalkane is obtained upon work-up. The α-thiocyanato-azoalkanes can be isomerized to the corresponding α-isothiocyanato-azoalkanes by gentle warming or by stirring a hydrocarbon solution of the α-thiocyanato-azoalkane over neutral alumina. For the low molecular weight azoalkanes having reasonable thermal stability, the isomers can be separated by gas chromatography. The α-thiocyanato-azoalkanes have a characteristic sharp but weak band around 2350 $cm^{-1}$ in their infrared spectrum while the α-isothiocyanato-azoalkanes have a characteristic strong broad band around 1900–2200 $cm^{-1}$.

It has been found that for the preparation of the α-isothiocyanato-azoalkanes, it is preferable to react the α-chloroazoalkanes at room temperature with sodium or ammonium thiocyanate in 50–75%, preferably 70–75%, aqueous isopropanol for 1–3 hours. It is advantageous to follow the formation of the α-thiocyanato-azoalkane and its consequent rearrangement to the α-isothiocyanato-azoalkane by infrared spectroscopy or gas chromatography. The reaction can also be run in aqueous methanol or ethanol, but varying amounts of the corresponding α-alkoxy-azoalkanes form as side products. Other suitable solvents are aqueous solutions of other water miscible solvents such as acetone, dioxane or dimethylformamide.

After the reaction and isomerization are complete, the reaction mixture can be poured into water and the product extracted with pentane, hexane or methylene chloride. The solvent solution is then washed with 10% $NaHCO_3$ solution, dried and the solvent evaporated under reduced pressure. If there is still some α-thiocyanato-azoalkane left, it can be converted to the α-isothiocyanato-azoalkane or separated from it by column chromatography over neutral alumina.

The t-alkyl, cycloakyl and aralkyl-azoalkanes containing one isocyanate group in the α-position to the azo group (I where Z = NCO and R''' ≠ Y) can be prepared by reacting the t-alkyl, cycloalkyl or aralkyl-α-chloroazoalkanes with aqueous alcohol solutions of potassium or sodium cyanate. Other suitable solvents are aqueous solutions of acetone, dioxane or dimethylformamide. The reaction conditions are very similar to those for the preparation of the α-isothiocyanato-azoalkanes.

Since some of the α-isocyanato-azoalkanes are more reactive than others, occasionally one obtains varying amounts of the corresponding azoalkanes containing α-carbamate groups due to some reaction of the alcohol solvent with the α-isocyanato-azoalkane. The α-carbamates can be separated from the α-isocyanates by chromatography over alumina if necessary.

The starting t-alkyl, cycloalkyl or aralkyl-α-chloroazoalkanes can be prepared by chlorinating the corresponding t-aliphatic ketone hydrazones according to the procedures described in British Pat. No. 1,272,284.

The t-aliphatic ketone hydrazones can be prepared by reacting a t-alkyl, cycloalkyl or aralkylhydrazine with a ketone $[R_1C(O)R_2]$ in water according to the procedure described in French Pat. No. 7,031,149, or by azeotroping off the water from a benzene solution of the hydrazine and ketone according to the procedure described in British Pat. No. 1,272,284.

Examples of suitable hydrazines are t-butylhydrazine, t-methylcyclohexylhydrazine, and t-cumylhydrazine which can be prepared according to the procedure described in U.S. Pat. No. 3,657,324, and 1-hydrazinoadamantane which can be prepared according to the procedure described in Canadian Pat. No. 817,426. Other t-alkylhydrazines can be prepared by running Grignard reactions on hydrazones prepared from acid hydrazides [according to the method of H. L. Yale and K. Losee, J. Am. Chem. Soc. 75, 1933 (1953)] followed by hydrolysis of the acyl group.

Although the t-alkylhydrazines will react with most ketones $[R_1C(O)R_2]$, some of the more suitable ketones for preparing the novel compounds include: acetone, methyl ethyl ketone, methyl propyl ketone, methyl isopropyl ketone, methyl isobutyl ketone, methyl butyl ketone, 4-methoxy-4-methyl-pentanone-2, 4,4-dimethylpentanone-2, 2-octanone, cyclopentanone, cyclohexanone, cyclooctanone, cyclododecanone, undecanone-2, methyl cyclopropyl ketone, methyl cyclohexyl ketone, 4-t-butylcyclohexanone, 3,3,5-trimethylcyclohexanone, 2-methylcyclohexanone, acetophenone, diisobutyl ketone, diethyl ketone, tetramethyl-1,3-cyclobutanedione, esters of levulinic acid such as allyl levulinate and n-butyl levulinate, ethyl acetoacetate, 1,3-diphenylacetone, 1'-acetonaphthone, 2'-acetonaphthone, indanone, tetralone, propiophenone, pinacolone, acetonyl acetone, 3-acetyl-1-propanol, benzylacetone, cyclohexylacetone, di-n-hexyl ketone, 3,5-dimethyl-4-heptanone, 2,4-dimethyl-3-hexanone, 5-methyl-2-hexanone, 10-nonadecanone, 4-octanone, 6-undecanone, 9-acetylanthracene, 5-benzoylvaleric acid, p-bromobutyrophenone, p-chloropropiophenone, 3,4-dimethylacetophenone, p-fluoropropiophenone, 8-ketotricyclo-[5.2.1.0$^{2,6}$]-decane, 5-methoxy-2-tetralone, 2-methylcyclohexanone, 1-adamantyl methyl ketone, cyclobutyl phenyl ketone, cyclopropyl phenyl ketone, and cyclohexyl phenyl ketone, all of which are commercially available.

B. α-Cyano-α'-isothiocyanato and α-Cyano-α'-isocyanato-azoalkanes

The α-cyano-α'-isothiocyanato-azoalkanes (I where Z is NCS and R''' = CN) can be prepared by reacting the corresponding α-cyano-α'-chloroazoalkane with aqueous alcohol solutions of ammonium or sodium thiocyanate under conditions sufficient to isomerize the initially formed α-cyano-α'-thiocyanato-azoalkane to the corresponding α-cyano-α'-isothiocyanato-azoalkane.

As in A., the rate of isomerization of the thiocyanate to the isothiocyanate varies with the structure of the azoalkane. The α-cyano-α'-thiocyanato-azoalkanes can be isomerized to the corresponding isothiocyanates by gentle warming, by standing for prolonged periods at room temperature or by stirring a hydrocarbon solution of the α-cyano-α'-thiocyanato-azoalkane over neutral alumina.

The reaction conditions for the preparation of the α-cyano-α'-isothiocyanato-azoalkanes is similar to the method used for the preparation of the t-aliphatic-α-isocyanato-azoalkanes in A.

The α-cyano-α'-isocyanato-azoalkanes (I where Z = NCO, and R''' = CN) can be prepared by reacting the corresponding α-cyano-α'-chloroazoalkanes with aqueous alcohol solutions of potassium cyanate. Other suitable solvents are aqueous solutions of acetone, dioxane or dimethylformamide. The reaction conditions are very similar to those for the preparation of the α-cyano-α'-isothiocyanato-azoalkanes.

As in case A, some of the α-cyano-α'-isocyanato-azoalkanes are more reactive than others and occasionally one obtains varying amounts of the corresponding azoalkanes containing α-carbamate groups due to some interaction of the alcohol solvent with the α-cyano-α'-isocyanato-azoalkane. The α-carbamates can be separated from the α-isocyanates by chromatography over alumina if necessary.

The starting α-cyano-α'-chloroazoalkanes can be prepared according to the method of Acksteiner and Goldschmidt [Acksteiner and Goldschmidt, Ann. 618, 173 (1958) ]. The method involves condensing one mole of hydrazine with two moles of ketone or with one mole each of two different ketones to give a symmetric or unsymmetric ketazine. The ketazine is then treated with one mole of hydrogen cyanide followed by an equivalent amount of chlorine to obtain the α-cyano-α'-chloroazoalkane. The ketones suitable for condensation with hydrazine to form the above ketazines are the ketones R$_1$C(O)R$_2$ noted in A. C. α,α'-Diisothiocyanato-azoalkanes The α,α'-diisothiocyanato-azoalkanes (I where Z = R''' = NCS) can be prepared by reacting the corresponding α,α'-dichloroazoalkane with aqueous alcohol solutions of ammonium or sodium thiocyanate similar to the procedure described for the preparation of the isomeric α,α'-dithiocyanato-azoalkanes in U.S. Pat. No. 3,282,912. The reaction mixture is diluted with water and the crude product extracted with a solvent and the solvent evaporated. The product is a mixture of the α,α'-thiocyanato-azoalkane and the desired α,α'-diisothiocyanato-azoalkane. The crude product is then recrystallized from a hydrocarbon solvent. The α,α'-dithiocyanato-azoalkanes are much less soluble and crystallize out of solution. They are characterized by a sharp but weak infrared band at 2350 cm$^{-1}$. The α,α'-diisothiocyanato-azoalkanes are obtained by evaporation of the recrystallization solvent. They are characterized by a strong broad infrared band at 2200–2200 cm$^{-1}$.

The starting α,α'-dichloroazoalkanes can be prepared according to the method of Acksteiner and Goldschmidt [Acksteiner and Goldschmidt, Ann. 618, 173 (1958); Chem. Ber. 91, 502 (1958)]. The α,α'-dichloroalkanes can be obtained by condensation of a ketone, R$_1$C(O)R$_2$(see A) with hydrazine and addition of chlorine to the resulting ketazine. D. αα'-Diisocyanato-azoalkanes The α,α'-diisocyanato-azoalkanes (I where Z= R'''= NCO) can be prepared by reacting the corresponding α,α'-dichloroazoalkanes with aqueous alcohol solutions of potassium or sodium cyanate. Other suitable solvents are aqueous solutions of acetone, dioxane, or dimethylformamide. The reaction conditions are very similar to the preparation of the t-aliphatic α-isocyanato and α-isothiocyanato-azoalkanes. The reaction mixtures are stirred for extended periods in the aqueous solvent (1 hour or longer) and at the end of this period the reaction product is diluted with water and extracted. The solvent is evaporated leaving a crude product which is primarily the α,α'-diisocyanato-azoalkane. The crude product may be purified by recrystallization with a hydrocarbon solvent or may be converted to a derivative (e.g., a urea) which is easier to purify. These compounds decompose on prolonged standing at room temperature.

The starting α, α'-dichloroazoalkanes can be prepared in the same manner as those in C.

E. Preparation of the α-Thiourea and α-Ureido Derivatives

The α-thiourea and α-ureido derivatives of the t-aliphatic -α-isothiocyanato-azoalkanes, α-cyano-α'-isothiocyanato-azoalkanes, α,α'-diisothiocyanato-azoalkanes, t-aliphatic -α-isocyanato-azoalkanes, α-cyano-α'-isocyanato-azoalkanes and α,α-'diisocyanato-azoalkanes can be prepared by adding ammonia, primary or secondary amines and primary or secondary diamines to a stirred pentane solution of the t-aliphatic-α-(isocyanato or isothiocyanato)-azoalkane, α-cyano-α'-(isocyanato or isothiocyanato)-azoalkane and α,α'-(diisocyanato or diisothiocyanato)-azoalkane. The α- thiourea and α-ureido derivatives are solids which have limited solubility in pentane and crystallize out of solution upon formation in almost all cases. The reaction may be followed by gas chromatography if the starting azo has sufficient thermal stability to go through the gas chromatograph. The reaction may also be followed by following the disappearance of the α-isothiocyanate band around 2000-2200cm$^{-1}$ or the α-isocyanate band around 2450 cm$^{-1}$ in the infrared spectrum.

In general, the reactions proceed quite rapidly and in some cases it is advisable to cool the reactions. In some cases, if the amine is very weakly basic, it is advisable to form the sodium salt of the amine with sodium hydride in an inert solvent and then add the isothiocyanate or isocyanate to it.

The following is a non-limiting list of amines which are useful in forming the α-thiourea and α-ureido azoalkanes: ammonia, methylamine, ethylamine, propylamine, isopropylamine, n-butylamine, isobutylamine, secondary-butylamine, t-butylamine, ethylenediamine, piperazine, adamantylamine, allylamine, allylcyclohexylamine, 6-aminocaproic acid, 2-aminoheptane, 6-amino-1-hexanol, 1-aminoindane, 5-aminolevulinic acid, 2-amino-1-methoxypropane, 3-aminomethylpyridine, 11-aminoundecanoic acid, n-amylamine, benzylamine, benzylmethylamine, N-benzylpropargylamine, bis-(2-ethoxyethyl)amine, 4-t-butylcyclohexylamine, 4-chlorobenzylamine, cyclododecylamine, cyclohexylamine, cyclopropylamine, n-decylamine, diallylamine, 1,4-diaminobutane, 1,12diaminododecane, 1,3-diaminopropane, dicyclohexylamine, diethanolamine, diethylamine, diisopropylamine, dimethylamine, dodecylamine, ethanolamine, 2-ethylhexylamine, furfurylamine, 1,6-hexanediamine, hydroxylamine, isoamylamine, methyl 3-aminocrotonate, N-methylaniline, N-methylcyclodecylamine, t-octylamine, phenethylamine, tetrahydrofurfurylamine, n-undecylamine, m-xylylenediamine, m-aminoaceto-phenone, 1-aminoanthracene, p-aminobenzoic acid, 4-aminobenzyl cyanide, 2-aminofluorene, 2-aminonaphthalene, 4-amino-1,8-naphthalimide, p-aminophenol, p-bromoaniline, 2-chloroaniline, 3,5 -diaminobenzoic acid, 2,5-diaminofluorene, 2,4-dimethoxyaniline, diphenylamine, ethyl p-aminobenzoate, 3-fluoroaniline, methyl anthranilate, p-phenylenediamine, o-toluidine, 2-amino-5-chloropyridine, 2-amino-4-picoline, 2,6-diamino-pyridine, glycine methyl ester, L-phenylalanine and L-serine, which are all commercially available.

The amines react with the α-isocyanato and α-isothiocyanato-azoalkanes according to the following reactions:

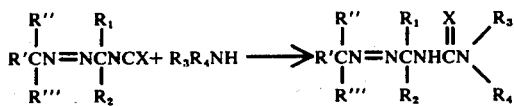

where R''' ≠ NCX and X = oxygen or sulfur;

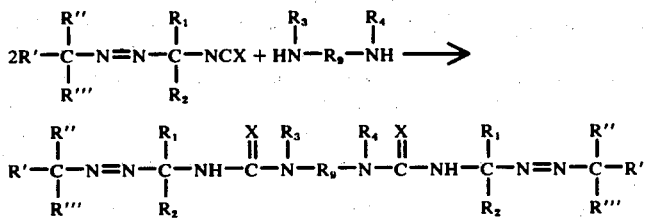

where R''' ≠ NCX and X = oxygen or sulfur;

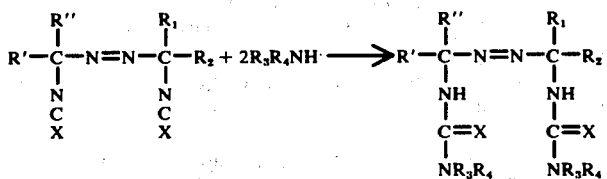

where X = oxygen or sulfur; and

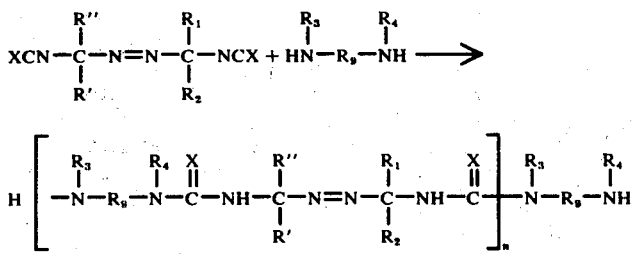

where X = oxygen or sulfur.

F. Preparation of the α-Semicarbazide and α-Thiosemicarbazide Azoalkanes

The derivatives formed by the reaction of hydrazines and hydrazine derivatives are α-thiosemicarbazide and α-semicarbazide derivatives. Primary and secondary alkylhydrazines react with the α-isothiocyanates and α-isocyanates at the nitrogen adjacent to the alkyl group since this is the more basic nitrogen, e.g.

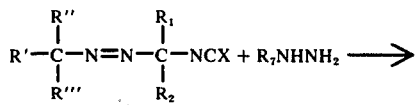

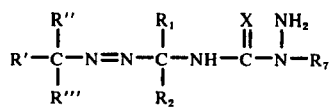

where R''' ≠ NCX and X = oxygen or sulfur; and

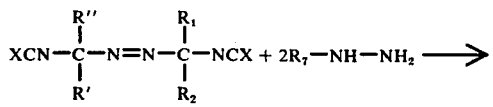

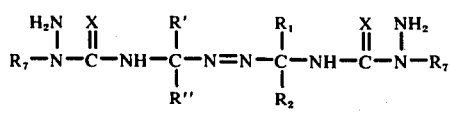

X = oxygen or sulfur.

Examples of such hydrazines are methylhydrazine, ethylhydrazine, propylhydrazine, isopropylhydrazine, n-butylhydrazine, isobutylhydrazine, secondary-butylhydrazine, n-amylhydrazine, isoamylhydrazine, cyclohexylhydrazine, n-octylhydrazine, n-dodecylhydrazine, benzylhydrazine, 2-phenylethylhydrazine and 2-hydroxyethylhydrazine, all of which are readily available either commercially or by well-known synthetic routes.

t-Alkylhydrazines and arylhydrazines react with the α-isothiocyanates and α-isocyanates at the terminal nitrogen, e.g.

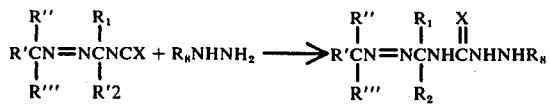

where R''' ≠ NCX and X = oxygen or sulfur; and

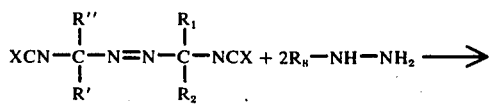

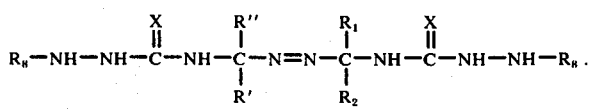

Examples of such hydrazines are t-butylhydrazine, t-amylhydrazine, t-methylcyclohexylhydrazine, t-cumylhydrazine, t-adamantylhydrazine, phenylhydrazine, 3-chlorophenylhydrazine, 4-chloro-o-tolylhydrazine, 2,4-dichlorophenylhydrazine, 3-fluorophenylhydrazine, 2-hydrazinopyridine, o-methoxyphenylhydrazine and m-tolylhydrazine. The preparation of the t-alkylhydrazines is described above and the arylhydrazines are commercially available.

Unsymmetrical dialkyl-hydrazines react similar to the t-alkyl-hydrazines:

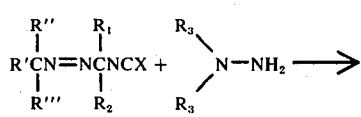

-continued

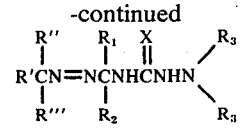

Examples of such hydrazines are 1,1-dimethylhydrazine and 1,1-diethylhydrazine.

Acid hydrazides, semicarbazides, carbohydrazide and carbazates also react with the α-isothiocyanates and α-isocyanates on the terminal nitrogen, e.g. Acid hydrazides

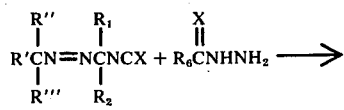

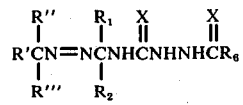

where R''' ≠ NCX.

Acid dihydrazides

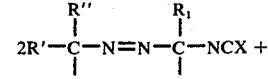

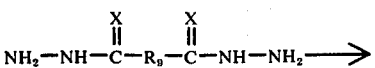

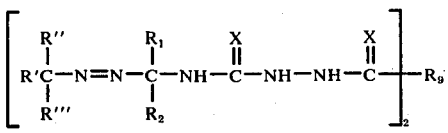

where R''' ≠ NCX.

Examples of such acid hydrazides and acid dihydrazides are acethydrazide, benzoylhydrazide, butyric acid hydrazide, cyclopropanecarboxylic acid hydrazide, 2-furoic acid hydrazide, glutaric acid dihydrazide, p-hydroxybenzoic acid hydrazide, 3-hydroxy-2-naphthoic acid hydrazide, indole-3-acetic acid hydrazide, isonicotinic acid hydrazide, nicotinic acid hydrazide, oxalyl dihydrazide, phenylacetic acid hydrazide, salicylhydrazide, succinic acid dihydrazide and p-toluic acid hydrazide, all of which are commercially available.

Semicarbazides and Thiosemicarbazides

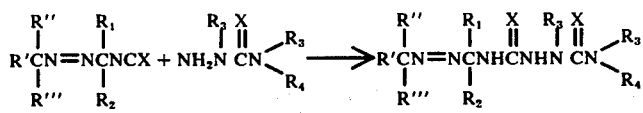

where R''' ≠ NCX.

Bis-semicarbazides and bis-thiosemicarbazides

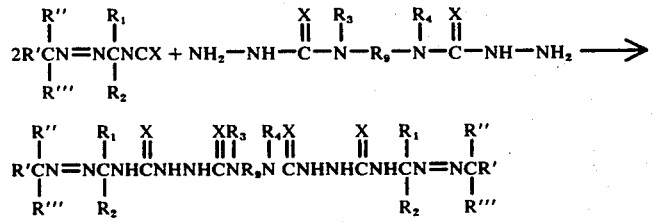

where R''' ≠ NCX.

Examples of such semicarbazides and thiosemicarbazides are semicarbazide, thiosemicarbazide, 4-allylthiosemicarbazide, 4-cyclohexylthiosemicarbazide, 4-ethyl-3-thiosemicarbazide and 4-phenylsemicarbazide, all of which are commercially available. Other semicarbazides which are readily available from the reaction of 2-phenyl-Δ²-1,3,4-oxadiazolin-5-ones with amines followed by acid hydrolysis [A. Stempel, J. Zelanskas and J. Aeschlimann, J Org. Chem. 20, 412 (1955)] include 4-allylsemicarbazide, 4-n-butylsemicarbazide, 4,4-diethylsemicarbazide, 4,4-dimethylsemicarbazide, and 4-methylsemicarbazide.

Bis semicarbazides which are useful in the above reactions are prepared by the reaction of diamines with 2-phenyl-Δ²-1,3,4- oxadiazolin-5-one followed by acid hydrolysis (U.S. Pat. No. 3,585,200 ), include 4,4'-ethylenebis-semicarbazide and 4,4,4', 4'-diethylenebis-semicarbazide. Other bis semicarbazides can be made by the same route by substituting diamines such as 1,4-diaminobutane, 1,12-diaminododecane, 1,3-diaminopropane, 1,6-hexanediamine, m-xylylenediamine and 2,6-diaminopyridine, all of which are commercially available.

Carbohydrazide, which is also commercially available, reacts with the α-isothiocyanates and α-isocyanates in a manner similar to the bis semicarbazides:

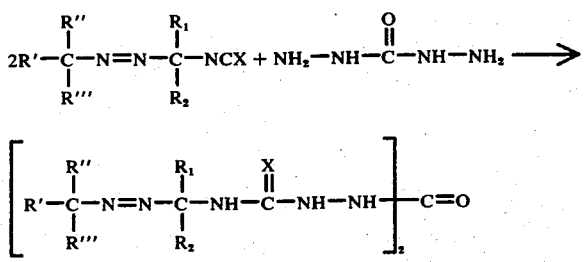

where R''' ≠ NCX.

Carbazates and Thiocarbazates

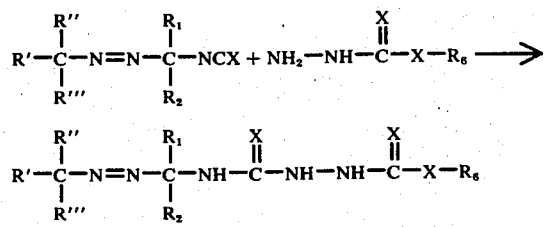

where R''' ≠ NCX.

Bis-Carbazates and Bis-Thiocarbazates

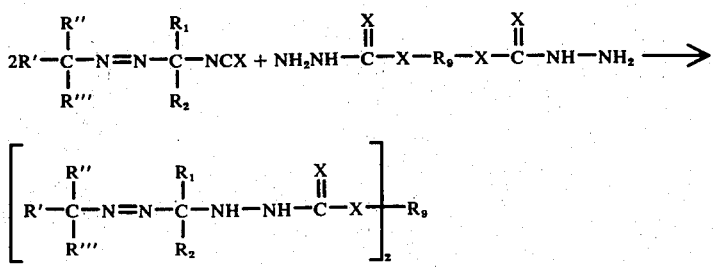

where R''' ≠ NCX.

Examples of suitable carbazates which are commercially available include: t-butyl carbazate and ethyl carbazate. Other carbazates easily prepared from hydrazine and the corresponding carbonates and/or chloroformates include: butyl, isobutyl, amyl, isoamyl, hexyl, heptyl, octyl and dodecyl carbazates [Japan Patent No. 14,720 (63)].

One mole of hydrazine or a symmetrical dialkyl or diarylhydrazine will react with 2-moles of the t-aliphatic α-isothiocyanato (or α-isocyanato) azoalkanes or 2-moles of the α-cyano-α'-isothiocyanato (or α-isocyanato) azoalkanes as follows:

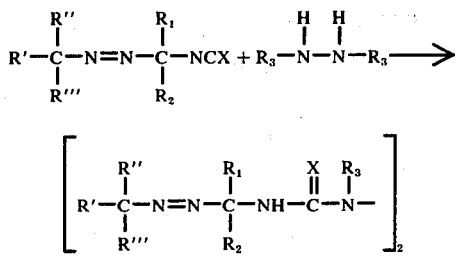

where R''' ≠ NCX

Examples of suitable hydrazines include hydrazine, 1,2-dimethylhydrazine, 1,2-diphenylhydrazine which are commercially available. Many more 1,2-dialkylhydrazines are prepared by the hydrogenation of ketazines such as those derived from acetone, methyl ethyl ketone, methyl butyl ketone, methyl isobutyl ketone, cyclohexanone, cyclopentanone, cyclooctanone, 2-octanone and many others.

If one mole of the α,α'-diisothiocyanato-azoalkanes or α,α'-diisocyanatoazoalkanes are reacted with difunctional hydrazine derivatives such as hydrazine, acid dihydrazides, bis semicarbazides, bis carbazates, or carbohydrazide, polymeric azo compounds result.

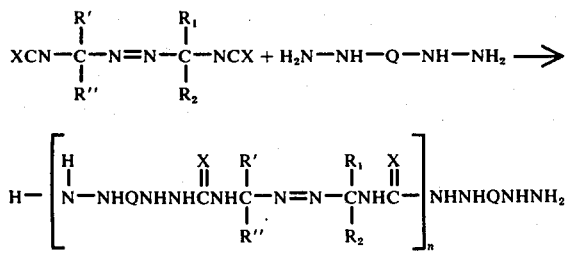

where Q may be

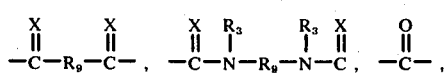

or

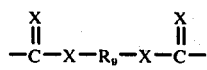

and QNHNH$_2$ may be hydrogen.

Since many of the acid hydrazides, semicarbazides, thiosemicarbazides, carbohydrazide, carbazates and thiocarbaztes as well as their difunctional counterparts are insoluble in pentane, it is advisable to run the reactions in solvents such as methanol, ethanol or dimethylformamide.

G. Preparation of the α-Carbamate and α-Thiocarbamate Azoalkanes

The α-carbamate and α-thiocarbamate azoalkanes can be formed by reacting the α-isocyanato and α-isothiocyanato azoalkanes with alcohols in the presence of a base. Alcohol solutions of metal hydroxides such as sodium or potassium hydroxide are especially suitable for these reactions. The α-isocyanato azoalkanes are much more reactive than the corresponding α-isothiocyanato-azoalkanes. Many of the α-isocyanato azoalkanes will react to a considerable extent without any basic catalyst while the α-isothiocyanatoazoalkanes have to be stirred overnight to obtain complete reaction. The reactions are easily carried out in the lower molecular weight alcohols such as methanol, ethanol, propanol, isopropanol, butanol, isobutanol, sec-butanol and tert.-butanol. If for some reason it is desirable to run the reaction with higher molecular weight alcohols or with thiols, then inert solvents such as ethers or N,N-dimethylformamide should be employed.

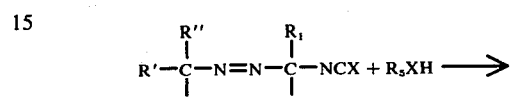

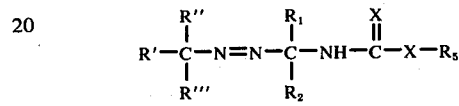

where R''' ≠ NCX and X = oxygen or sulfur.

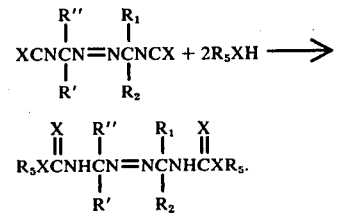

The α-isocyanato and α-isothiocyanato-azoalkanes can also be reacted with diols such as ethylene glycol, 1,4-butanedoil, 1,6-hexanediol, dithiols such as 1,2-ethanedithiol, 1,4-butanedithiol, and 1,6-hexanedithiol to form difunctional azos (when R''' ≠ NCX) and polymeric azos (when R'''=NCX).

The α,α'-diisocyanato-azoalkanes and α,α-'diisocyanato-azoalkanes can also react with certain difunctional active hydrogen compounds such as diamines, hydrazines, diols, or dithiols to form various amounts of cyclic azos as well as the polymeric azos described in F. These cyclic azo derivatives are also useful in the foaming of polyester resins

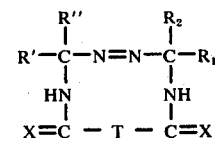

where T may be

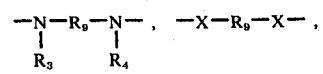

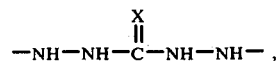

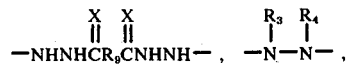

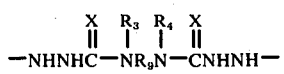

and

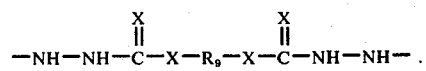

Utility

These compounds are free radical generators, polymerization initiators for vinyl monomers, initiators for free radical initiated chemical reactions, blowing agents for producing foamed polymers and plastics, selective oxidizing agents and generators of reactant free radicals. Many of these compounds are also useful as curing agents for polyester resins.

These compounds are initiators for the polymerization or copolymerization of unsaturated monomers such as alkenes, vinyl halides, vinyl esters, vinylindene halides and alkenyl aromatics.

Illustrative polymerizable monomers are ethylene, vinyl chloride, vinylidene chloride, vinyl acetate, vinylpyridine, vinylpyrrolidone, vinylcarbazole, butadiene, isoprene, acrylonitrile, acrylic acid, acrylic acid esters, methacrylic acid, methacrylic acid esters, styrene, chlorostyrene and methylstyrenes.

The compounds evolve one mole of nitrogen gas per azo group in the compound when they are decomposed. In addition, other gasses are evolved from the breakdown and/or disproportionation of the radicals formed. Thus, the compounds are useful in applications where copious quantities of gasses are desired such as in producing foamed polymers.

Although the novel compounds are for the most part (depending on R', R'' and R''') stable at ambient temperature, they are acid sensitive and can be decomposed at ambient temperatures when mixed with acids. Depending on the structure of the compounds, their physical state, and their solubility in the various systems, some of the I compounds are more sensitive than others.

The capability of activating these compounds with acids at ambient temperatures makes them ideal foaming agents for polyester resins. Suitable acids for activating the compounds include inorganic acids such as sulfuric, sulfurous, phosphoric, phosphorous, hydrochloric and nitric acids; organic acids such as acetic, formic, methane-sulfonic, adipic, oxalic, propionic, succinic, benzoic, phthalic and trichloroacetic acids, and in some cases free carboxyl groups in unsaturated polyester resins are sufficient to activate the I compounds. It has also been found that certain acyl alkyl-(cycloalkyl)-sulfonyl peroxides are effective activating agents for the compounds, e.g.:
  acetyl cyclopentylsulfonyl peroxide
  acetyl cyclohexylsulfonyl peroxide
  acetyl methylcyclohexylsulfonyl peroxide
  acetyl tert.-butylsulfonyl peroxide
  acetyl tert.-amylsulfonyl peroxide
  acetyl sec.-hexylsulfonyl peroxide
  acetyl sec.-heptylsulfonyl peroxide
  propionyl cyclohexylsulfonyl peroxide
  n-butyryl cyclohexylsulfonyl peroxide.

In some cases it is advantageous to add a conventional polyester curing agent (peroxide or non-sensitive azo-compound) to the unsaturated polyester foaming formulation to enhance the curing of the polyester foam.

Suitable curing agents include the following:
  benzoyl peroxide
  acetyl peroxide
  methyl ethyl ketone peroxides
  t-butyl peracetate
  t-butyl peroctoate
  t-butyl perbenzoate
  azocumene
  2-t-butylazo-2-cyano-4-methoxy-4-methylpentane
  2-t-butylazo-2-cyano-4-methylpentane azobis-(isobutyronitrile)
  1-cyano-1-(t-butylazo)-cyclohexane
  2,2'-azobis-(2,4-dimethylvaleronitrile)
  2-t-butylazo-2-cyanopropane.

EXAMPLES

The following examples illustrate the invention but are not in limitation thereof:

EXAMPLE I

Preparation of
1-t-Butylazo-1-isothiocyanatocyclohexane

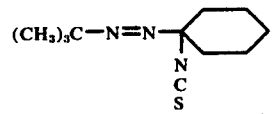

A. 1-t-Butylazo-1-chlorocyclohexane

To a stirred solution of 252 grams (1.5 moles) of cyclohexanone t-butylhydrazone and 160 grams (1.5 moles) of triethylamine in 1200 ml pentane in a 3 liter 4 neck flask equipped with a mechanical stirrer, thermometer and gas inlet tube, was added 107 grams (1.5 moles) of chlorine gas, holding the temperature at $-10°$ C. After the chlorine addition was complete, the reaction mixture was stirred an additional 15 minutes and the insoluble triethylamine hydrochloride filtered off. The filter cake was washed with an additional 300 ml pentane and the filtrate stripped of pentane under reduced pressure. The yield of 1-t-butylazo-1-chlorocyclohexane was 266 grams (87.5% crude yield).

B. 1-t-Butylazo-1-isothiocyanatocyclohexane

To a stirred solution of 91.5 grams (1.05 moles) of sodium thiocyanate in 450 ml of 75% aqueous isopropanol in a 2 liter jacketed reactor, cooled to 5° C, was added 203.2 grams (1.0 moles) of 1-t-butylazo-1-chlorocyclohexane holding the reaction temperature at 10°–20° C. After the addition was complete, the reaction mixture was stirred an additional 90 minutes at room temperature, 900 ml of water added and the reaction stirred until the sodium chloride dissolved. The product was extracted with 300 ml pentane, the pentane extract washed successively with water, 10% NaHCO$_3$ solution, water, dried over anhydrous sodium sulfate, filtered and the pentane evaporated under reduced pressure to leave 173 grams (75% crude yield) of a yellow liquid. The product had a broad band at approximately 2040 cm$^{-1}$ in its infrared spectrum which is indicatative of the isothiocyano band in these compounds. There was no band at 2170 cm$^{-1}$ (thiocyano band).

EXAMPLE II

Preparation of
N-[1-(t-Butylazo)cyclohexyl]-N'-cyclohexylthiourea

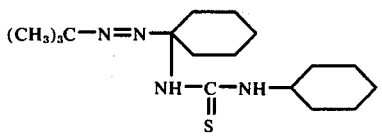

To 8.4 grams (.0363 moles) of 1-t-butylazo-1-isothiocyanatocyclohexane stirred with a magnetic stirrer in a 50 ml erlenmeyer flask was added 3.6 grams (.0363 moles) of cyclohexylamine at room temperature. A solid slowly started to form and pentane was added to keep the reaction mixture from solidifying and the reaction mixture was stirred for 3 hours and the pentane stripped off to leave a yellow solid weighing 11.4 grams (95% crude yield). The product melted at 100°–102° C and the infrared spectrum of the product had a strong broad band at 1520–1540 cm$^{-1}$ and a NH band at 3220 cm$^{-1}$. The isothiocyanate band at 2040 cm$^{-1}$ was absent.

EXAMPLE III

Preparation of
N-[1-(t-Butylazo)cyclohexyl]-N'-t-butylthiourea

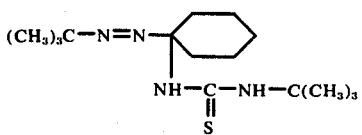

To 9.1 grams (.0394 moles) of 1-t-butylazo-1isothiocyanatocyclohexane stirred with a magnetic stirrer in a 50 ml erlenmeyer flask was added 2.88 grams (.0394 moles) of t-butylamine at room temperature. A solid slowly started to form and pentane was added to keep the reaction mixture from solidifying and the reaction mixture was stirred for 3 hours and the pentane stripped off to leave a yellow solid weighing 10.9 grams (91% crude yield). The product melted at 95°–98° C and the infrared spectrum of the product had strong bands at 1520 and 1550 cm$^{-1}$ and a sharp NH band at 3300 cm$^{-1}$. There was a small amount of unreacted starting material presence, indicated by the presence of a weak isothiocyanate band at 2040 cm$^{-1}$.

EXAMPLE IV

Preparation of
N-[1-(t-Butylazo)cyclohexyl]-N'-isobutylthiourea

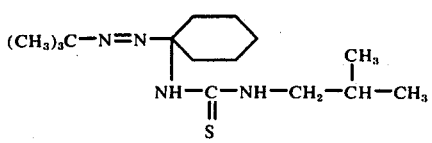

To 9.1 grams (.0394 moles) of 1-t-butylazo-1-isothiocyanatocyclohexane stirred with a magnetic stirrer in a 50 ml erlenmeyer flask was added 2.88 grams (.0394 moles) of isobutylamine at room temperature. The reaction mixture became viscous so pentane was added and the reaction was stirred an additional 4 hours and the pentane stripped off to leave a yellow solid weighing 11.6 grams (97% crude yield). The product melted at 90°–93° C and the infrared spectrum of the product had a strong broad band at 1520–1550 cm$^{-1}$ and a NH band at 3270 cm$^{-1}$. There was only a trace of the isothiocyanate band at 2040 cm$^{-1}$ which was present in the starting material.

EXAMPLE V

Preparation of
4-[1-(t-Butylazo)cyclohexyl]-1-phenylthiosemicarbazide

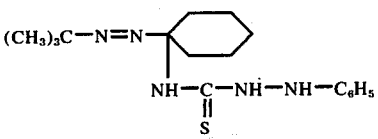

To 8.2 grams (.0354 moles) of 1-t-butylazo-1-isothiocyanatocyclohexane cooled to 5° C and stirred with a magnetic stirrer in a 50 ml erlenmeyer flask was added 3.84 grams (.0354 moles) of phenylhydrazine dropwise. The reaction was quite exothermic and was complete almost immediately after the addition was complete. Pentane was added to form a slurry, the reaction mixture stirred for 30 minutes at room temperature and the pentane stripped from the slurry to leave a white solid weighing 11.6 grams (97% crude yield).

The product melted at 100°–102° C with decomposition and bands at 1520 and 1550 cm$^{-1}$ and a NH band at 3130 and 3300 cm$^{-1}$. The isothiocyanate band of the starting material at 2040 cm$^{-1}$ was very weak.

EXAMPLE VI

Preparation of
4-[1-(t-Butylazo)cyclohexyl]-2-methylthiosemicarbazide

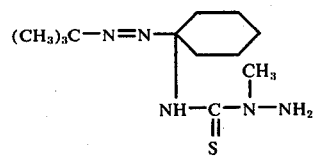

To 10.0 grams (.0434 moles) of 1-t-butylazo-1-isothiocycanatocyclohexane cooled to 5° C and stirred with a magnetic stirrer in a 50 ml erlenmeyer flask was added 1.99 grams (.0434 moles) of methylhydrazine. The reaction was very exothermic and solids formed immediately. Pentane was added to form a slurry, the reaction mixture stirred for 30 minutes at room temperature and the pentane stripped from the slurry to leave a white solid weighing 10.7 grams (89% crude yield). The product melted at 118°–120° C with decomposition and its infrared spectrum had a strong band at 1515 cm$^{-1}$

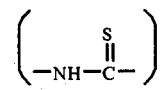

moderate NH bands at 3225 cm$^{-1}$ and the isothiocyanate at 2040 cm$^{-1}$ was absent.

EXAMPLE VII

Preparation of
N-[1-(t-Butylazo)cyclohexyl]-N',N'-diethylthiourea

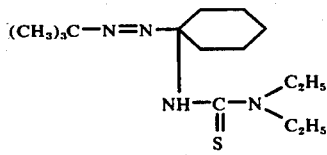

To 9.12 grams (.0395 moles) of 1-t-butylazo-1-isothiocyanatocyclohexane cooled to 10° C and stirred with a magnetic stirrer in a 50 ml erlenmeyer flask was added 2.89 grams (.0395 moles) of diethylamine. The reaction mixture was stirred for 3 hours at room temperature, adding pentane periodically to keep the viscosity low. The pentane was stripped from the reaction mixture to leave a yellow viscous oil weighing 11.4 grams (95% crude yield). The infrared spectrum of the product had a strong broad band at 1520 cm$^{-1}$ and a sharp NH band at 3300 cm$^{-1}$ and the isothiocyanate band at 2040 cm$^{-1}$ was very weak indicating there was a trace of the starting material still present.

EXAMPLE VIII

Preparation of
1,1'-Ethylenebis-[3-(1-t-butylazocyclohexyl)thiourea]

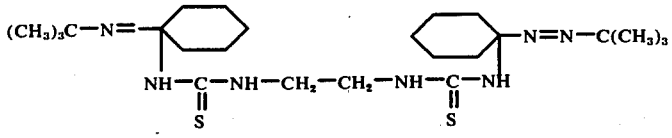

To 10.25 grams (.044 moles) of 1-t-butylazo-1-isothiocyanatocyclohexane cooled to 10° C and stirred with a magnetic stirrer in a 50 ml erlenmeyer flask was added 1.73 grams (.0222 moles) of ethylenediamine. The reaction mixture became viscous, pentane was added and the reaction mixture stirred for 6 hours at room temperature. The pentane was stripped from the reaction mixture to leave a yellow solid weighing 10.7 grams (90% crude yield). The product melted at 149°–152° C with decomposition and its infrared spectrum had a strong band at 1530 cm$^{-1}$ and moderate NH bands at 3350 cm$^{-1}$ and the isothiocyanate band at 2040 cm$^{-1}$ was absent.

EXAMPLE IX

Preparation of
4-[1-t-Butylazocyclohexyl)]-1,1-dimethylthiosemicarbazide

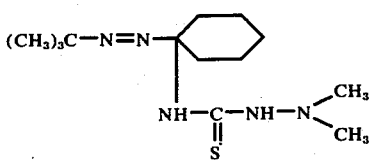

To 9.12 grams (.0395 moles) of 1-t-butylazo-1-isothiocyanatocyclohexane cooled to 10° C and stirred with a magnetic stirrer in a 50 ml erlenmeyer flask was added 2.89 grams (.0395 moles) of 1,1-dimethylhydrazine. The reaction mixture was diluted with pentane and stirred for 24 hours at room temperature. The pentane was stripped from the reaction mixture to leave a yellow solid weighing 10.6 grams (88.5% crude yield). The product melted at 85°–88° C and the infrared spectrum of the product had strong peaks at 1520 and 1540 cm$^{-1}$ and sharp NH bands at 3200 and 3300 cm$^{-1}$. There was a small amount of unreacted starting material, indicated by the presence of a weak isothiocyanate band at 2040 cm$^{-1}$.

EXAMPLE X

Preparation of
N-[1-(t-Butylazo)cyclohexyl]-N'-allylthiourea

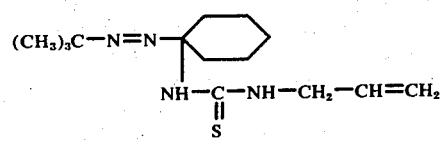

To 9.6 grams (.0416 moles) of 1-t-butylazo-1-isothiocyanatocyclohexane cooled to 10° C and stirred with a magnetic stirrer in a 50 ml erlenmeyer flask was added 2.37 grams (.0416 moles) of allylamine. The reaction mixture became viscous, was diluted with pentane and stirred for 24 hours at room temperature. The pentane was stripped from the reaction mixture to leave an orange liquid weighing 11.3 grams (94% crude yield). The infrared spectrum of the product had a strong band at 1525 cm$^{-1}$ and a sharp NH band at 3300 cm$^{-1}$ and the isothiocyante band at 2040 cm$^{-1}$ was very weak indicating a trace of the starting material was still present.

EXAMPLE XI

Preparation of
N-[1-(t-Butylazo)cyclohexyl]-N'-phenylthiourea

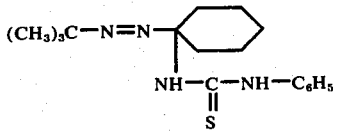

To 8.4 grams (.0363 moles) of 1-t-butylazo-1-isothiocyanatocyclohexane stirred with a magnetic stirrer in a 50 ml erlenmeyer flask was added 3.39 grams (.0363 moles) of aniline. The reaction mixture was diluted with pentane and stirred for 6 days. The pentane was stripped from the reaction mixture to leave a white solid weighing 11.5 grams (97% crude yield). The product melted at 110°–113° C and its infrared spectrum had strong bands at 1515 and 1550 cm$^{-1}$ and moderate NH bands at 3150 and 3280 cm$^{-1}$ and the isothiocyanate band at 2040 cm$^{-1}$ was absent.

EXAMPLE XII

Preparation of
4-[1-(t-Butylazo)cyclohexyl]-1-(t-Butyl)thiosemicarbazide

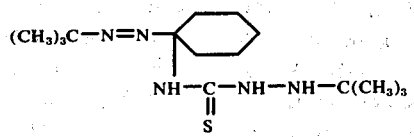

To 8.7 grams (.0376 moles) of 1-t-butylazo-1-isothiocyanatocyclohexane cooled to 5° C and stirred with a magnetic stirrer in a 50 ml erlenmeyer flask was added dropwise 4.36 grams (.0376 moles) of a 76% aqueous solution of t-butylhydrazine. The reaction was very exothermic and rapid and was complete almost immediately after the addition was complete. Pentane was added to slurry up the solids and the mixture stirred for 1 hour at room temperature. The pentane was stripped from the reaction mixture to leave a yellow solid weighing 11.3 grams (94.5% crude yield). The product melted at 120°–122° C and the infrared spectrum of the product had sharp strong bands at 1540 and 1520 cm$^{-1}$ and sharp NH bands at 3150 and 3280 cm$^{-1}$.

EXAMPLE XIII

Preparation of
1,2-Di[1-(t-butylazo)-cyclohexylaminothiocarbonyl]-hydrazine

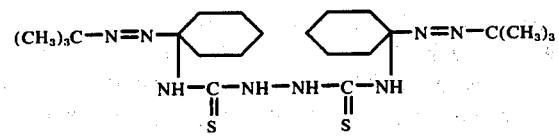

To 11.25 grams (.0486 moles) of 1-t-butylazo-1-isothiocyanatocyclohexane, cooled to 10° C and stirred with a magnetic stirrer in a 50 ml erlenmeyer flask was added 0.85 grams (.0243 moles) of 97% hydrazine. The reaction mixture became viscous, was diluted with pentane and the reaction mixture stirred for 3 days at room temperature. The pentane was stripped from the reaction mixture leaving a white solid weighing 11.0 grams (92% crude yield). The product melted at 110°–112° C and its infrared spectrum had strong bands at 1505 and 1545 cm$^{-1}$, moderate NH bands 3150–3200 cm$^{-1}$ and the isothiocyanate band at 2040 cm$^{-1}$ was absent.

EXAMPLE XIV

Preparation of 2-t-Butylazo-2-isocyanatopropane

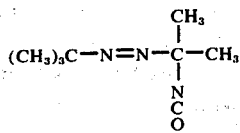

A. 2-t-Butylazo-2-chloropropane

To a stirred solution of 64 grams (0.5 moles) of acetone t-butylhydrazone and 51 grams (0.504 moles) of triethylamine in 400 ml of pentane in a 1 liter 4 neck flask equipped with a mechanical stirrer, thermometer and gas inlet tube, was added 35.5 grams (0.5 moles) of chlorine gas, holding the temperature at −5° to 0° C. After the chlorine addition was complete, the reaction mixture was stirred an additional 15 minutes and the insoluble triethylamine hydrochloride filtered off. The filter cake was washed with an additional 150 ml pentane and the filtrate used in the subsequent reaction.

B. 2-t-Butylazo-2-isocyanatopropane

To a stirred solution of 40.5 grams (0.5 moles) of potassium cyanate in 250 ml of 75% aqueous isopropanol in a 2 liter jacketed reactor, cooled to 5° C, was added the above pentane solution of 2-t-butylazo-2-chloropropane over 15 minutes, holding the reaction temperature at 10°–20° C. After the addition was complete, the reaction mixture was stirred an additional 2 hours at room temperature, 500 ml of water added and the reaction stirred until the salts dissolved. The pentane layer was separated, washed with 250 ml water, 250 ml 10% NaHCO$_3$ solution, dried over anhydrous Na$_2$SO$_4$, filtered and the pentane evaporated under reduced pressure to leave 59.6 grams (70% overall crude yield) of a yellow liquid. The product had a strong broad band at 2225 cm$^{-1}$ in its infrared spectrum.

EXAMPLE XV

Preparation of
1-[1-(t-Butylazo)cyclohexylaminothiocarbonyl]-semicarbazide

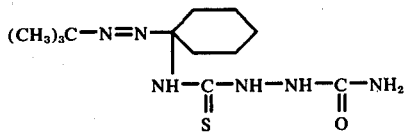

To a solution of 2.49 grams (0.0223 moles) of semicarbazide hydrochloride in 25 ml of methanol in a 50 ml erlenmeyer flask was added 1.75 grams (0.0223 moles) of 50% NaOH and the reaction stirred 15 minutes. To this solution was added 5.15 grams (0.0223 moles) of 1-t-butylazo-1-isothiocyanatocyclohexane and the reaction mixture stirred for 6 days at room temperature. The methanol was evaporated under reduced pressure, the residue slurried in water and filtered. The filter cake weighed 5.0 grams (73% crude yield) after drying and was a pale yellow solid. The product did not melt but decomposed around 180° C. The infrared spectrum of the product contained amide carbonyls at 1620 and 1675 cm$^{-1}$, a strong band at 1540 cm$^{-1}$ [-N(H)CS], a strong NH band at 3200 cm$^{-1}$ and weaker NH bands around 3400 cm$^{-1}$. The isothiocyanate band at 2040 cm$^{-1}$ was absent.

EXAMPLE XVI

Preparation of
4-[1-(t-Butylazo)cyclohexyl]-1-benzoylthiosemicarbazide

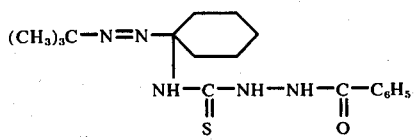

To a solution of 4.02 grams (0.0295 moles) of benzoylhydrazine in 25 ml of methanol in a 50 ml erlenmeyer flask was added 6.82 grams (0.0295 moles) of 1-t-butylazo-1-isothiocyanatocyclohexane and the reaction mixture stirred for 6 days at room temperature. The methanol was evaporated under reduced pressure leaving a pale yellow solid weighing 9.0 grams (75% crude yield). The product melted with decomposition at 190°–193° C. The infrared spectrum of the product had amide bands at 1640 and 1690 cm$^{-1}$, a strong band at 1550 cm$^{-1}$ [-N(H)CS] and weak NH bands from 3100–3300 cm$^{-1}$. The isothiocyanate band at 2040 cm$^{-1}$ was absent.

EXAMPLE XVII

Preparation of N-[1-(t-Butylazo)cyclohexyl]thiourea

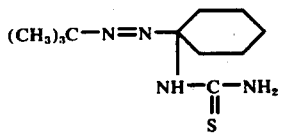

To a solution of 7.4 grams (0.032 moles) of 1-t-butylazo-1-isothiocyanatocyclohexane in 80 ml of methanol in a 250 ml reaction flask equipped with magnetic stirrer, thermometer, dry-ice condenser and gas addition tube was added NH$_3$ gas until an NH$_3$ reflux was obtained in the condenser. The reaction mixture was stirred for 3 hours at room temperature while maintaining a gentle NH$_3$ reflux in the dry ice condenser. The reaction mixture was then poured into 200 ml of water and the product extracted with methylene chloride. The methylene chloride extract was washed with 10% NaHCO$_3$ solution, water, dried over anhydrous sodium sulfate, filtered and the methylene chloride evaporated under reduced pressure. The residue was slurried in pentane and the slurry filtered. The white solid filter cake was air dried and weighed 4.5 grams (57% crude yield). The product melted at 155°–157° C with decomposition. The infrared spectrum of the product contained a strong band at 1525 cm$^{-1}$ and 3 NH bands at 3180, 3250 and 3400 cm$^{-1}$.

EXAMPLE XVIII

Preparation of 1-t-Butylazo-1-isocyanatocyclohexane

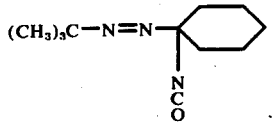

A. 1-t-Butylazo-1-chlorocyclohexane 1-t-Butylazo-1-chlorocyclohexane was prepared as in Example IA except the pentane solution was assayed for hydrolyzable chlorine and the percent 1-t-butylazo-1-chlorocyclohexane in the pentane solution determined.

B. 1-t-Butylazo-1-isocyanatocyclohexane

To a stirred solution of 48.7 grams (0.6 moles) of potassium cyanate in 250 ml of 75% aqueous isopropanol in a 2 liter jacketed reactor, cooled to 5° C, was added 371 grams (0.5 moles) of a 27.4% pentane solution of 1-t-butylazo-1-chlorocyclohexane holding the reaction temperature at 10°–20° C. After the addition was complete, the reaction mixture was stirred an additional 90 minutes at room temperature, 300 ml of water added and the reaction stirred until the sodium chloride dissolved. The product was extracted with 300 ml pentane, the pentane extract washed successively with water, 10% NaHCO$_3$ solution, water, dried over anhydrous sodium sulfate, filtered and the pentane evaporated under reduced pressure to leave 100 grams (94.6% crude yield) of a yellow liquid. The product has a sharp band at approximately 2225 cm$^{-1}$ which is indicative of the isocyanato band in these compounds.

EXAMPLE XIX

Preparation of N-[1-(t-Butylazo)cyclohexyl]-N'-isobutylurea

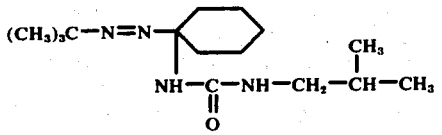

To 7.4 grams (0.0353 moles) of 1-t-butylazo-1-isocyanatocyclohexane stirred with a magnetic stirrer in a 50 ml erlenmeyer flask was added 2.59 grams (0.0353 moles) of isobutylamine. The reaction mixture became viscous, was diluted with pentane and stirred for 3 hours at room temperature. The pentane was stripped from the reaction mixture leaving a yellow solid weighing 9.7 grams (97% crude yield). The product melted at 90°–92° C. The infrared spectrum of the product contained a very strong urea type carbonyl around 1625 cm$^{-1}$ and a broad NH band at 3330 cm$^{-1}$. The isocyanate band at 2225 cm$^{-1}$ was absent.

EXAMPLE XX

Preparation of 4-[1-(t-Butylazo)cyclohexyl]-1-phenylsemicarbazide

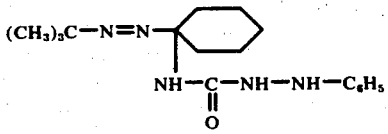

To 6.6 grams (0.0315 moles) of 1-t-butylazo-1-isocyanatocyclohexane cooled to 5° C and stirred with a magnetic stirrer in a 50 ml erlenmeyer flask was added dropwise 3.42 grams (0.0315 moles) of phenylhydrazine. The reaction was very exothermic and rapid. Pentane was added to slurry the solid product and the slurry was filtered. The white solid filter cake was air dried and weighed 10.0 grams (100% crude yield). The product melted at 140°–142° C with decomposition. The infrared spectrum of the product contained a strong carbonyl band at 1670 cm$^{-1}$ and NH bands at 3100, 3230 and 3320 cm$^{-1}$. The isocyanate band at 2225 cm$^{-1}$ was absent.

EXAMPLE XXI

Preparation of
1,1′-Ethylenebis[3-(1-t-butylazocyclohexyl)urea]

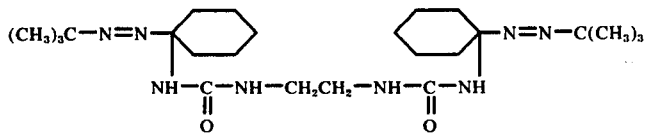

To 8.4 grams (0.0402 moles) of 1-t-butylazo-1-isocyanatocyclohexane stirred with a magnetic stirrer in a 50 ml erlenmeyer flask was added 1.57 grams (0.0201 moles) of ethylenediamine. Solids formed and the reaction mixture was diluted with pentane and stirred for 3 hours at room temperature. The pentane was stripped from the reaction mixture leaving a semi-solid. The semi-solid was slurried in cold pentane and filtered. The white solid filter cake was air dried and weighed 10.0 grams (75% crude yield). The product melted at 165°–167° C with decomposition. The infrared spectrum of the product contained a strong carbonyl band at 1670 cm$^{-1}$ and NH bands at 3300 and 3340 cm$^{-1}$. The isocyanate band at 2225 cm$^{-1}$ was absent.

EXAMPLE XXII

Preparation of
N-[1-(t-Butylazo)cyclohexyl]-N′,N′-diethylurea

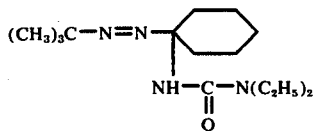

To 7.4 grams (0.0354 moles) of 1-t-butylazo-1-isocyanatocyclohexane stirred with a magnetic stirrer in a 50 ml erlenmeyer flask was added 2.49 grams (0.0354 moles) of diethylamine and the reaction mixture stirred at room temperature. When the reaction mixture became viscous pentane was added. The reaction mixture was stirred for 3 hours and the pentane evaporated under reduced pressure leaving a white wax weighing 10.0 grams (96% crude yield). The infrared spectrum of the product contained a strong carbonyl band at 1640 cm$^{-1}$ and a sharp NH band at 3380 cm$^{-1}$. The isocyanate band at 2225 cm$^{-1}$ was absent.

EXAMPLE XXIII

Preparation of
4-[1-(t-Butylazo)cyclohexyl]-2-methylsemicarbazide

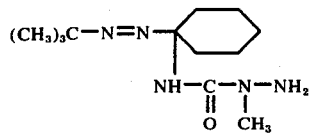

To 8.2 grams (0.0392 moles) of 1-t-butylazo-1-isocyanatocyclohexane stirred with a magnetic stirrer in a 50 ml erlenmeyer flask and cooled to 5° C was added 1.82 grams (0.0392 moles) of methylhydrazine. The reaction was very rapid and exothermic and became quite viscous. The reaction mixture was diluted with pentane and stirred for an additional 60 minutes at room temperature. The pentane was evaporated under reduced pressure leaving 9.0 grams (90% crude yield) of a yellow solid. The product melted at 169°–171° C with decomposition. The infrared spectrum of the product contained a strong carbonyl band at 1660 cm$^{-1}$ and a moderate NH band at 3320 cm$^{-1}$. The isocyanate band at 2225 cm$^{-1}$ was absent.

EXAMPLE XXIV

Preparation of
N-[1-(t-Butylazo)cyclohexyl]-N′-phenylurea]

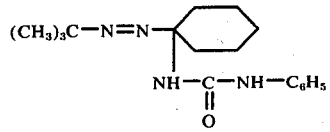

To 6.9 grams (0.033 moles) of 1-t-butylazo-1-isocyanatocyclohexane stirred with a magnetic stirrer in a 50 ml erlenmeyer flask was added 3.08 grams (0.033 moles) aniline. The reaction mixture was stirred for three days at room temperature. The solid mass that formed was slurried in pentane and filtered. The filter cake was air dried and weighed 9.2 grams (92% crude yield). The product melted at 169°–171° C with decomposition and the infrared spectrum of the product contained a strong carbonyl band at 1650 cm$^{-1}$ and a sharp NH band at 3320 cm$^{-1}$ and the isocyanate band at 2225 cm$^{-1}$ of the starting material was absent.

EXAMPLE XXV

Preparation of
1,2-Di[1-(t-butylazo)cyclohexylaminocarbonyl]hydrazine

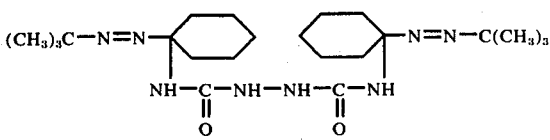

To 9.27 grams (0.044 moles) of 1-t-butylazo-1-isocyanatocyclohexane stirred with a magnetic stirrer in a 50 ml erlenmeyer flask was added 0.74 grams (0.022 moles) of 97% hydrazine. The reaction mixture rapidly became a solid and pentane was added to slurry the mixture. The slurry was then stirred for 60 minutes at room temperature and filtered. The filter cake was dried leaving 9.5 grams (95% crude yield) of a white powder. The product melted at 195°–197° C with decomposition. The infrared spectrum of the product contained a strong carbonyl band at 1665 cm$^{-1}$ and a broad NH band at 3350 cm$^{-1}$ and a weaker band at 3080 cm$^{-1}$.

EXAMPLE XXVI

Preparation of N-[1-(t-Butylazo)cyclohexyl]urea

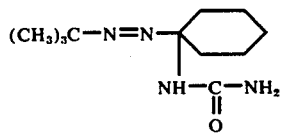

To a solution of 9.25 grams (0.0442 moles) of 1-t-butylazo-1-isocyanatocyclohexane in 50 ml of methanol in a 250 ml 3-neck round bottom flask equipped with a magnetic stirrer, thermometer, gas addition tube and dry ice condenser was added gaseous ammonia until a gentle ammonia reflux was maintained in the condenser. The reaction was stirred for 90 minutes at room temperature, poured into 300 ml water and the solid that formed was filtered off. The filter cake was air dried leaving 9.0 grams (90% crude yield) of a white powder. The product melted at 115°–117° C and its infrared spectrum contained a strong carbonyl band at 1670 $cm^{-1}$ and sharp NH bands at 3250 $cm^{-1}$ 3330 $cm^{-1}$ and 3440 $cm^{-1}$. The isocyanate band at 2225 $cm^{-1}$ was absent.

EXAMPLE XXVII

Preparation of
1-t-Butylazo-1-isothiocyanato-1-phenylethane

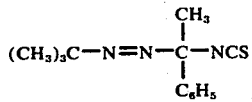

A. 1-t-Butylazo-1-chloro-1-phenylethane 1-t-Butylazo-1-chloro-1-phenylethane was prepared in 99% crude yield by adding 34.8 grams (0.49 moles) of chlorine to a pentane solution of 92.8 grams (0.49 moles) of acetophenone t-butylhydrazone and 50.5 grams (0.50 moles) of triethylamine at 0° C, filtering off the insoluble triethylamine hydrochloride that forms and evaporating the pentane under reduced pressure. The yield was 109 grams of a yellow liquid.

B. 1-t-Butylazo-1-isothiocyanato-1-phenylethane

To a stirred solution of 26.0 grams (0.32 moles) of sodium thiocyanate in 150 ml of 75% aqueous isopropanol cooled to 5° C in a 500 ml erlenmeyer flask was added 71.4 grams (0.32 moles) of 1-t-butylazo-1-chloro-1-phenylethane over 3 minutes holding the temperature at 5°–10° C with an ice bath. The reaction mixture was stirred for 90 minutes at room temperature, poured into 300 ml water and the product extracted with 100 ml of pentane. The pentane extract was washed twice with 100 ml water, once with 10% NaHCO₃ solution, dried over anhydrous sodium sulfate, filtered and the pentane evaporated under reduced pressure. The product was a light brown liquid which weighed 43.3 grams (54.6% crude yield). The infrared spectrum of the product had a very strong broad band at 1960–2175 $cm^{-1}$ which is indicative of the α-isothiocyanate.

EXAMPLE XXVIII

Preparation of
N-[1-(t-Butylazo)-1-phenylethyl]-N'-isobutylthiourea

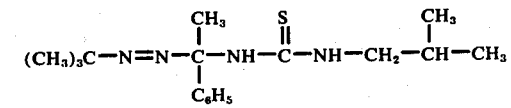

To 9.25 grams (0.0375 moles) of 1-t-butylazo-1-isothiocyanato-1-phenylethane stirred with a magnetic stirrer in a 50 ml erlenmeyer flask was added 2.75 grams (0.0375 moles) of isobutylamine. The reaction mixture was stirred for 30 minutes at room temperature at which time an infrared spectrum of the reaction mixture showed the complete absence of the isocyanate band at 2225 $cm^{-1}$. The orange liquid weighed 10.2 grams (85% crude yield) and its infrared spectrum contained a strong band around 1530 $cm^{-1}$.

EXAMPLE XXIX

Preparation of
2,2'-Azobis(2-isocyanato-4-methylpentane)]

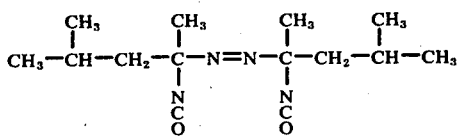

A. 2,2'-Azobis(2-chloro-4-methylpentane)

2,2'-Azobis(2-chloro-4-methylpentane) was prepared in 88.5% yield by passing 71 grams (1.0 mole) of chlorine into a pentane solution of 207 grams (1.0 mole) of 95% ketazine of methyl isobutyl ketone at 5°–15° C. The chlorinated solution was washed with cold water, 10% NaHCO₃ solution, water, dried over anhydrous sodium sulfate, filtered and the pentane evaporated under reduced pressure to leave 236 grams of product.

B. 2,2'-Azobis(2-isocyanato-4-methylpentane)

To a stirred solution of 17.8 grams (0.22 moles) of potassium cyanate in 150 ml of 70% aqueous isopropanol in a 250 ml erlenmeyer flask was added 26.72 grams (0.1 mole) of 2,2'-azobis (2-chloro-4-methylpentane) over 40 minutes while holding the temperature below 20° C with a water bath. After the addition was complete, the reaction mixture was stirred for 60 minutes at room temperature, poured into 400 ml cold water and extracted with pentane. The pentane extract was washed with water, 10% NaHCO₃, water, dried over anhydrous sodium sulfate, stirred over neutral alumina, filtered and the pentane evaporated under reduced pressure to leave 15.4 grams (55% crude yield). The infrared spectrum of the product has a strong band centered at 2250 $cm^{-1}$ indicative of the isocyanate group. It also shows the presence of a little methyl isobutyl ketone.

EXAMPLE XXX

Preparation of
2,2'-Azobis(2-isothiocyanato-4-methylpentane)

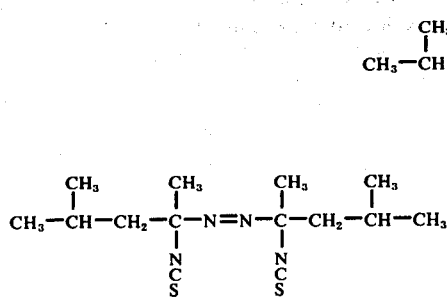

To a stirred solution of 19.2 grams (0.22 moles) of sodium thiocyanate in 120 ml of 75% aqueous isopropanol in a 250 ml erlenmeyer flask was added 26.7 grams (0.1 mole) of 2,2'-azobis(2-chloro-4-methylpentane) (from Example XXIXA) over 40 minutes while holding the temperature below 20° C with a water bath. After the addition was complete the reaction mixture was stirred an additional 60 minutes at room temperature, poured into 300 ml water and extracted with pentane. The pentane extract was washed with water, 10% NaHCO₃ solution, water, dried over anhydrous sodium sulfate, filtered and the pentane evaporated under reduced pressure to leave a yellow semi-solid. The semi-solid was slurried in cold pentane and filtered. The filter cake was dried and weighed 8.0 grams (25% crude yield). This material was the undesired 2,2'-azobis(2-thiocyanato-4-methylpentane) and had a sharp band at 2170 cm$^{-1}$ in its infrared spectrum. The pentane filtrate was stripped under reduced pressure to leave 11.0 grams (34% crude yield) of a yellow liquid. The infrared spectrum of this liquid had a strong broad band at 2000–2130 cm$^{-1}$ in its infrared spectrum which is indicative of the isothiocyanate isomer.

EXAMPLE XXXI

Preparation of
2,2'-Azobis[2-(isobutylaminocarbonylamino)-4-methylpentane]

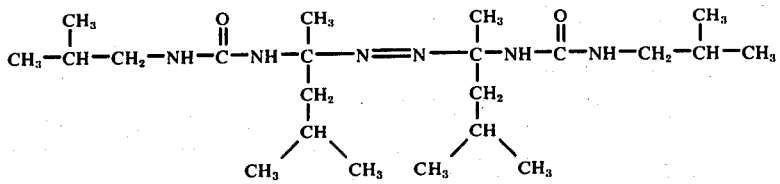

To a solution of 3.44 grams (0.047 moles) of isobutylamine in 20 ml of pentane in a 50 ml erlenmeyer flask, cooled by a water bath, was added dropwise with stirring 6.56 grams (0.0235 moles) of 2,2'-azobis(2-isocyanato-4-methylpentane) (from Example XXIX). The reaction was stirred for 90 minutes during which time the insoluble product dropped out of the pentane. The pentane was evaporated under reduced pressure leaving 5.9 grams (59% crude yield) of a viscous light brown liquid. The infrared spectrum of the product showed a strong broad urea type carbonyl at 1610 cm$^{-1}$. The isocyanate band at 2250 cm$^{-1}$ that was present in the starting material is absent.

EXAMPLE XXXII

Preparation of
2,2'-Azobis[2-(isobutylaminothiocarbonylamino)-4-methylpentane]

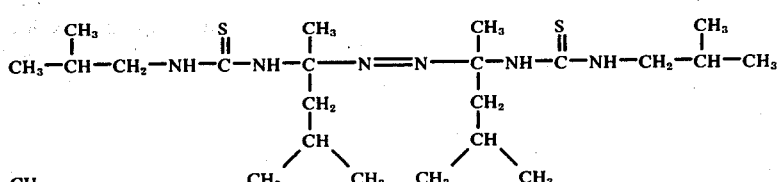

To a solution of 3.13 grams (0.0428 moles) of isobutylamine in 20 ml of pentane in a 50 ml erlenmeyer flask, cooled by a water bath, was added dropwise with stirring 6.9 grams (0.0214 moles) of 2,2'-azobis (2-isothiocyanato-4-methylpentane) (from Example XXX). The reaction mixture was stirred for 3 hours and the pentane evaporated under reduced pressure leaving 8.5 grams (85% crude yield) of a brown oil. The infrared spectrum of the product showed a strong broad band at 1530–1555 cm$^{-1}$ (indicative of the

group in these azos) a NH band at 3300 cm$^{-1}$ and the absence of the isothiocyanate band at 2000–2130 cm$^{-1}$ that was present in the starting material.

EXAMPLE XXXIII

Preparation of 2,2'-Azobis-(2-isocyanatopropane)

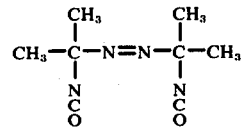

A. 2,2'-Azobis-(2-chloropropane)

2,2'-Azobis (2-chloropropane) was prepared in 88% yield by passing 71 grams (1.0 mole) of chlorine into a pentane solution of 132 grams (1.0 mole) of 85% acetone ketazine at −5° to 0° C. The chlorinated solution was washed with cold water, 10% NaHCO₃ solution, water, dried over anhydrous Na₂SO₄, filtered and the pentane evaporated under reduced pressure to leave 161.5 grams of white solids.

B. 2,2'-Azobis-(2-isocyanatopropane)

To a stirred solution of 53.5 grams (0.66 moles) of potassium cyanate in 400 ml of 70% aqueous isopropanol in a 2 liter jacketed reactor equipped with a mechanical stirrer was added dropwise over 40 minutes a solution of 55 grams (0.30 moles) of 2,2'-azobis (2-chloropropane) in pentane and isopropanol at 10°–20° C. The reaction mixture was stirred an additional 60 minutes at room temperature, diluted with 600 ml water, to dissolve the salts, and the pentane layer separated. The pentane extract was washed with water, 10% NaHCO₃ solution, dried over anhydrous Na₂SO₄, filtered and the pentane evaporated under reduced pressure leaving 24 grams of a yellow semi-solid. The semi-solid was slurried in pentane, cooled in dry ice and filtered. The filter cake was air dried leaving 14.6 grams (25.7% crude yield) of white crystals. The infrared spectrum of the product had a strong band at 2250 cm⁻¹ which is indicative of the isocyanate band in these azos.

The pentane filtrate was stripped under reduced pressure leaving 8.0 grams of a liquid. The infrared spectrum of the residue indicated it was a mixture of the desired 2,2'-azobis (2-isocyanatopropane) (strong band at 2250 cm⁻¹) and 2,2'-azobis [2-(isopropoxycarbonylamino)propane] (NH band at 3300 cm⁻¹ and carbonyl band at 1730 cm⁻¹) which results from the reaction of 2,2'-azobis (2-isocyanatopropane) with isopropanol.

EXAMPLE XXXIV

Preparation of 2,2-Azobis-[2-(1-phenylhydrazinocarbonylamino)propane]

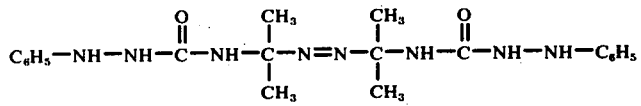

To a stirred solution of 4.0 grams (0.0204 moles) of 2,2'-azobis (2-isocyanato-propane) (from Example XXXIII) in 20 ml of pentane in a 50 ml erlenmeyer flask was added 4.42 grams (0.0408 moles) of phenylhydrazine and the reaction mixture stirred for 2 hours at room temperature. The solids that formed were filtered off, washed with a small amount of cold acetone and air dried. The tan powder weighed 4.5 grams (54% crude yield). The product melts at 159°–162° C with decomposition. The infrared spectrum of the product is in agreement with the structure of the proposed compound (urea type carbonyl at 1670 cm⁻¹ and NH bands at 3270 and 3400 cm⁻¹).

EXAMPLE XXXV

Preparation of 2,2'-Azobis(2-isothiocyanatopropane)

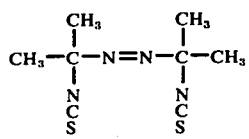

To a stirred solution of 61 grams (0.7 moles) of sodium thiocyanate in 900 ml of 70% aqueous isopropanol in a 2 liter jacketed reactor equipped with a mechanical stirrer, was added 55 grams (0.3 moles) of 2,2'-azobis (2-chloropropane) over 30 minutes holding the temperature at 30°–35° C. After the addition was complete the reaction mixture was stirred for an additional 60 minutes at 30° C, diluted with 1500 ml water and the mixture stirred 5 minutes to dissolve the salts. The stirring was stopped and the pentane and solids at the interface were separated and the solids filtered off and air dried. The dried solids weighed 37.7 grams (65.5% crude yield) and the presence of a sharp band at 2150 cm⁻¹ and the absence of a strong broad band at 2000–2100 cm⁻¹ in its infrared spectrum indicates the solid is the undesirable 2,2'-azobis (2-thiocyanatopropane) isomer. The pentane filtrate was washed with water, 10% NaHCO₃ solution, dried over anhydrous sodium sulfate, filtered and the pentane evaporated under reduced pressure. The residue was an orange liquid weighing 9.3 grams (16% crude yield) whose infrared spectrum contained a strong broad band at 2000–2100 cm⁻¹ indicating the compound was the desired 2,2'-azobis (2-isothiocyanatopropane) isomer.

EXAMPLE XXXVI

Preparation of 2,2'-Azobis-(2-isocyanatobutane)

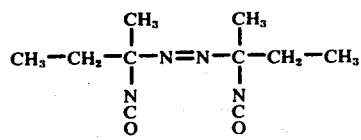

A. 2,2'-Azobis-(2-chlorobutane)

2,2'-Azobis (2-chlorobutane) was prepared in 88% yield by passing 44.3 grams (0.624 moles) of chlorine into a solution of 87.5 grams (0.624 moles) of methyl ethyl ketone ketazine in 500 ml of pentane at −5° to 0° C. The chlorinated solution was washed with cold water, 10% NaHCO₃ solution, water, dried over anhydrous Na₂SO₄, filtered and the pentane evaporated under reduced pressure to leave 115.2 grams of a light yellow liquid.

B. 2,2'-Azobis-(2-isocyanatobutane)

To a rapidly stirred solution of 56.8 grams (0.7 moles) of potassium cyanate in 450 ml of 80% aqueous acetone in a 2 liter jacketed reactor equipped with a mechanical stirrer, thermometer and addition funnel was added 63.5 grams (0.3 moles) of 2,2'-azobis (2-chlorobutane) dropwise over a 20 minute period holding the temperature at 15°–20° C. After the addition was complete, the reaction mixture was stirred an additional 35 minutes at room temperature, diluted with 800 ml of water and extracted with about 250 ml of pentane. The pentane extract was washed with water, 10% NaHCO₃ solution, dried over anhydrous sodium sulfate, filtered and the pentane evaporated under reduced pressure. The yellow liquid residue weighed 41.1 grams (61% crude yield) and had a strong band at 2175–2275 cm⁻¹ which is indicative of the α-isocyanate band.

EXAMPLE XXXVII

Preparation of
2-t-Butylazo-2-isothiocyanato-4-methylpentane

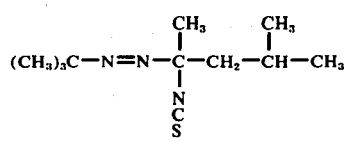

A. 2-t-Butylazo-2-chloro-4-methylpentane

To a stirred solution of 169.5 grams (1.0 mole) of the t-butylhydrazone of methyl isobutyl ketone and 106.5 grams (1.05 mole) of triethylamine in 800 ml of pentane in a 2 liter 4 neck flask, equipped with a mechanical stirrer, thermometer and gas inlet tube, was added 71 grams (1.0 mole) of chlorine gas holding the temperature at −10° to 0° C. After the chlorine addition was complete, the reaction mixture was stirred an additional 15 minutes and the insoluble triethylamine hydrochloride filtered off. The filter cake was washed with an additional 300 ml pentane and the filtrate stripped of pentane under reduced pressure. The yield of 2-t-butylazo-2-chloro-4methylpentane was 185 grams (90.5% crude yield).

B. 2-t-Butylazo-2-isothiocyanato-4-methylpentane

To a stirred solution of 26.1 grams (0.3 moles) of sodium thiocyanate in 150 ml of 75% aqueous isopropanol in a 500 ml erlenmeyer flask, cooled to 5° C, was added 61.2 grams (0.3 moles) of 2-t-butylazo -2-chloro-4-methylpentane holding the reaction temperature at 10°–20° C. After the addition was complete, the reaction mixture was stirred an additional two hours at 30° C, poured into 300 ml water and the product extracted with 200 ml pentane. The pentane extract was washed with water, 10% NaHCO₃ solution, dried over anhydrous sodium sulfate, filtered and the pentane evaporated under reduced pressure to leave 55.7 grams (80% crude yield) of a yellow liquid. The product had a strong broad band at 1980–2080 cm⁻¹ in its infrared spectrum which is indicative of the isothiocyano band.

EXAMPLE XXXVIII Preparation of N-[1-(t-Butylazo)-1,3-dimethylbutyl]-N'-butylthiourea

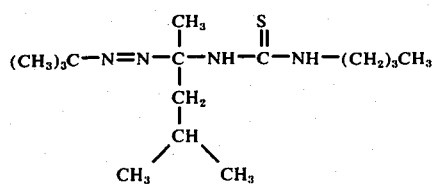

To 22.65 grams (0.1 mole) of 2-t-butylazo-2-isothiocyanato-4-methylpentane stirred with a magnetic stirrer in a 125 ml erlenmeyer flask was slowly added 7.7 grams (0.105 mole) of n-butylamine. After the addition was complete, the reaction mixture was stirred for 3 hours at 30° C, dissolved in pentane, transferred to a round bottom flask and the pentane evaporated under reduced pressure. The residue was then stripped under high vacuum to remove any low boilers. The residue weighed 30 grams (100% yield) and its infrared spectrum contained peaks around 1500–1550 cm⁻¹ which appears to be due to the

group and NH peaks around 3350 cm⁻¹. The isothiocyano band around 2040 cm⁻¹ had disappeared.

EXAMPLE XXXIX

Preparation of
2,2'-Azobis[2-(cyclohexylaminocarbonylamino)butane]

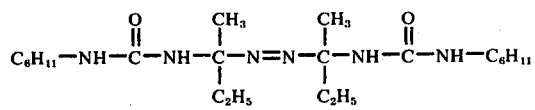

To a stirred solution of 4.7 grams (0.0474 moles) of cyclohexylamine in 30 ml of pentane in a 50 ml erlenmeyer flask cooled in a water bath was added 5.32 grams (0.0237 moles) of 2,2'-azobis(2-isocyanatobutane) (from Example XXXVI) dropwise over 20 minutes while holding the reaction temperature below 30° C. After the addition was complete, the reaction was stirred for an additional 60 minutes at room temperature and filtered. The filter cake was washed with pentane and dried. The dry white solid weighed 4.7 grams (47% crude yield) and melted at 110-113° C. The product had a strong carbonyl band at 1665 cm⁻¹ and NH peaks at 3320 cm⁻¹ and 3440 cm⁻¹ in its infrared spectrum.

EXAMPLE XL

Preparation of
2,2'-Azobis[2-(t-butylhydrazinocarbonylamino)butane]

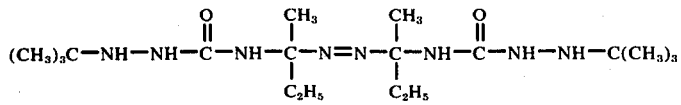

To a stirred solution of 5.8 grams (0.05 moles) of 76% t-butylhydrazine in 30 ml pentane in a 50 ml erlenmeyer flask cooled in a water bath was added 5.6 grams (0.025 moles) of 2,2'-azobis(2-isocyanatobutane (from Example XXXVI) dropwise over 20 minutes while holding the reaction temperature below 30° C. After the addition was complete, the reaction was stirred for an additional 60 minutes at room temperature and filtered. The filter cake was washed with pentane and dried. The dry white solid weighed 3.3 grams (33% crude yield) and melted at 155°–160° C with decomposition. The product had a broad strong carbonyl band at 1625–1675 cm⁻¹ and a broad strong NH band at 3300–3450 cm⁻¹ in its infrared spectrum and the isocyanate band at 2200 cm⁻¹ was absent.

EXAMPLE XLI

Preparation of
2,2'-Azobis[2-(diethylaminocarbonylamino)butane]

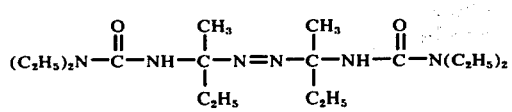

To a stirred solution of 3.95 grams (0.054 moles) of diethylamine in 30 ml pentane in a 50 ml erlenmeyer flask cooled in a water bath was added 6.05 grams (0.027 moles) of 2,2'-azobis(2-isocyanatobutane) (from Example XXXVI) dropwise over 20 minutes while holding the reaction temperature below 30° C. After the addition was complete, the reaction was stirred for an additional 60 minutes at room temperature and filtered. The filter cake was washed with pentane and dried. The dry white solid weighed 1.8 grams (18% crude yield) and melted at 215°–220° C with decomposition. The product had a broad carbonyl band at 1650 cm$^{-1}$ and a strong NH band at 3400 cm$^{-1}$ in its infrared spectrum and the isocyanate band at 2200 cm$^{-1}$ was absent.

EXAMPLE XLII

Preparation of
2,2'-Azobis[2(phenylaminocarbonylamino)butane]

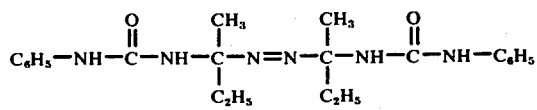

To a stirred solution of 4.44 grams (0.0476 moles) of aniline in 30 ml of pentane in a 50 ml erlenmeyer flask cooled in a water bath was added 5.33 grams (0.0236 moles) of 2,2'-azobis (2-isocyanatobutane) (from Example XXXVI) dropwise over 20 minutes while holding the reaction temperature below 30° C. After the addition was complete, the reaction was stirred for an additional 60 minutes at room temperature and filtered. The filter cake was washed with pentane and dried. The dry white solid weighed 1.5 grams (15% crude yield) and melted at 118°–120° C. The product had a strong carbonyl band at 1680 cm$^{-1}$ and NH peaks at 3220 and 3420 cm$^{-1}$ in its infrared spectrum and there was no isocyanate band at 2200 cm$^{-1}$.

Example XLIII

Preparation of
2,2'-Azobis[2-(methoxycarbonylamino)butane]

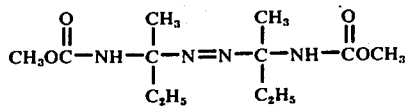

To 50 ml of methanol in a 125 ml erlenmeyer flask stirred with a magnetic stirrer, was slowly added 2.1 grams (0.05 moles) of 57% sodium hydride. After the temperature came back down to 30° C, 5.6 grams (0.025 moles) of 2,2'-azobis(2-isocyanatobutane) was added dropwise over 2 minutes from an eyedropper. The reaction mixture exothermed to 45° C over this period. The reaction mixture was stirred an additional 1½ hours, poured into 200 ml water and the product extracted with a solution of 75 ml of pentane and 40 ml methylene chloride. The organic layer was separated, washed twice with water, once with 10% NaHCO$_3$ solution, dried over anhydrous Na$_2$SO$_4$, filtered and the solvent evaporated under reduced pressure to leave 2.0 grams (28% crude yield) of an orange liquid. The product had a strong carbonyl band at 1700 cm$^{-1}$ and a sharp NH band at 3340 cm$^{-1}$ and there is no isocyanate band at 2200 cm$^{-1}$.

EXAMPLE XLIV

Preparation of
1-t-Butylazo-1-(methoxycarbonylamino)cyclohexane

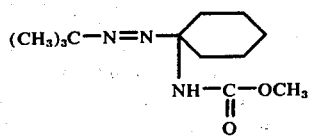

To 30 ml of methanol in a 100 ml 3 neck round bottom flask equipped with a thermometer and magnetic stirrer was slowly added 2.1 grams (0.05 moles) of 57% sodium hydride. After the temperature came back to 25° C, 10.5 grams (0.05 moles) of 1-t-butylazo-1-isocyanatocyclohexane was added dropwise over 5 minutes. There was a 2° C rise in temperature during the addition. After the addition was complete, the reaction was stirred an additional 30 minutes at room temperature. Gas chromatography indicated that the 1-t-butylazo-1-isocyanatocyclohexane had reacted almost immediately. The reaction mixture was poured into 300 ml water and the product extracted with 100 ml methylene chloride. The methylene chloride extract was separated, washed with water, 100 ml 10% HaHCO$_3$ solution, dried over anhydrous Na$_2$SO$_4$, filtered and the methylene chloride evaporated under reduced pressure to leave 11.0 grams (91% crude yield) of a yellow liquid. The product had a strong carbonyl band at 1730 cm$^{-1}$ and a sharp NH band at 3400 cm$^{-1}$ in its infrared spectrum and the isocyanate band at 2225 cm$^{-1}$ was absent.

EXAMPLE XLV

Preparation of
1-t-Butylazo-1-(ethoxycarbonylamino)cyclohexane

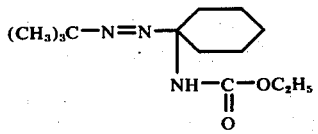

To 50 ml of ethanol in a 125 ml erlenmeyer flask stirred with a magnetic stirrer, was slowly added 2.1 grams (.05 moles) of 57% sodium hydride. After the temperature came back to 25° C, 10.5 grams (.05 moles) of 1-t-butylazo-1-isocyanatocyclohexane was added dropwise over 5 minutes. After the addition was complete, the reaction was stirred an additional 30 minutes at room temperature. Gas chromatography indicated that the 1-t-butylazo-1-isocyanatocyclohexane had reacted almost immediately. The reaction mixture was poured into 300 ml water and the product extracted with 100 ml pentane. The pentane extract was separated, washed with water, 10% NaHCO$_3$ solution, dried over anhydrous Na$_2$SO$_4$, filtered and the

EXAMPLE XLVI

Preparation of
1-t-Butylazo-1-(isopropoxycarbonylamino)cyclohexane

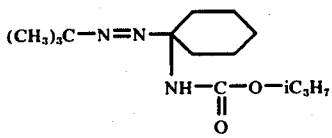

To 50 ml of isopropanol in a 125 ml erlenmeyer flask stirred with a magnetic stirrer, was slowly added 2.1 grams (.05 moles) of 57% sodium hydride. After the temperature came back to 25° C, 10.5 grams (.05 moles) of 1-t-butylazo-1isocyanatocyclohexane was added dropwise over 5 minutes. After the addition was complete, the reaction was stirred an additional 30 minutes at room temperature. Gas chromatography indicated that the 1-t-butylazo-1-isocyanatocyclohexane had reacted almost immediately. The reaction mixture was poured into 300 ml water and the product extracted with 100 ml pentane. The pentane extract was separated, washed with water, 10% NaHCO$_3$ solution, dried over anhydrous Na$_2$SO$_4$, filtered and the pentane evaporated under reduced pressure to leave 11.0 grams (81.5% crude yield) of a yellow liquid. The product had a strong carbonyl band at 1725 cm$^{-1}$ and a sharp NH band at 3400 cm$^{-1}$ in its infrared spectrum and the isocyanate band at 2225 cm$^{-1}$ was absent.

EXAMPLE XLVII

Preparation of
1-t-Butylazo-1-(t-butoxycarbonylamino)cyclohexane

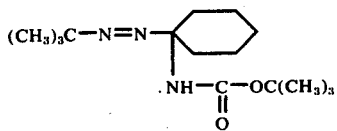

To 50 ml of t-butanol in a 125 ml erlenmeyer flask stirred with a magnetic stirrer, was slowly added 2.1 grams (0.05 moles) of 57% sodium hydride. The reaction mixture was stirred 15 minutes and 10.5 grams (0.05 moles) of 1-t-butylazo-1-isocyanatocyclohexane was added dropwise over 5 minutes. After the addition was complete, the reaction was stirred an additional hour at room temperature. The reaction mixture was checked by gas chromatography which indicated the absence of starting material. The reaction mixture was poured into 300 ml water and the product extracted with 100 ml pentane. The pentane extract was separated, washed with water, 10% HaHCO$_3$ solution, dried over anhydrous Na$_2$SO$_4$, filtered and the pentane evaporated under reduced pressure to leave 9.5 grams (67% crude yield) of a yellow liquid which partially crystallized on standing. The semi-solid was filtered to give 3.1 grams of a yellow liquid which had a strong carbonyl band at 1730 cm$^{-1}$ and a sharp NH band 3450 cm$^{-1}$ in its infrared spectrum which is in agreement with the structure of the desired product. The product decomposes slowly from 80°–90° C and rapidly above 100° C.

EXAMPLE XLVIII

Preparation of
1-t-Butylazo-1-(methoxythiocarbonylamino)cyclohexane

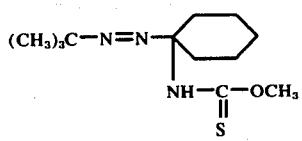

To 50 ml of methanol in a 125 ml erlenmeyer flask stirred with a magnetic stirrer, was slowly added 2.1 grams (.05 moles) of 57% sodium hydride. The reaction mixture was cooled back to 25° C and 11.2 grams (.05 moles) of 1-t-butylazo-1-isothiocyanatocyclohexane was added dropwise over 5 minutes. The reaction mixture was stirred 24 hours at room temperature, poured into 300 ml water and the product extracted with 100 ml pentane. The pentane extract was washed with water, 10% NaHCO$_3$ solution, dried over anhydrous Na$_2$SO$_4$, filtered, and the pentane evaporated under reduced pressure to leave 9.2 grams of a mushy semi-solid. The semi-solid was slurried in cold pentane and filtered. The solids were dried and weighed 5.6 grams (43.5% crude yield) and melted at 79°–82° C. The infrared spectrum of the product had a strong broad band at 1530 cm$^{-1}$ and a sharp NH band at 3250 cm$^{-1}$.

EXAMPLE XLIX

Preparation of
1-t-Butylazo-1-(ethoxythiocarbonylamino)cyclohexane

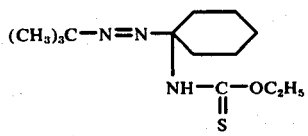

To 50 ml of ethanol in a 125 ml erlenmeyer flask stirred with a magnetic stirrer, was slowly added 2.1 grams (.05 moles) of 57% sodium hydride. The reaction mixture was cooled back to 25° C and 11.2 grams (.05 moles) of 1-t-butylazo-1-isothiocyanatocyclohexane was added dropwise over 5 minutes. The reaction mixture was stirred for 2 hours and then allowed to stand overnight. The next morning the reaction mixture was poured into 200 ml water and the product extracted with 50 ml pentane. The pentane extract was washed twice with water, once with 10% NaHCO$_3$, dried over anhydrous Na$_2$SO$_4$, filtered and the pentane evaporated under reduced pressure to leave a mushy solid. The solid was slurried in a small amount of cold pentane and filtered. The solids were air dried and weighed 7.1 grams (52% crude yield) and melted at 57°–62° C. The product had a strong broad band at 1515 cm$^{-1}$ and a sharp NH band at 3300 cm$^{-1}$ in its infrared spectrum.

EXAMPLE L

Preparation of
1-t-Butylazo-1-(isopropoxythiocarbonylamino)cyclohexane

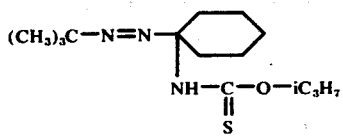

To 50 ml of isopropanol in a 125 ml erlenmeyer flask stirred with a magnetic stirrer, was slowly added 2.1 grams (.05 moles) of 57% sodium hydride. The reaction mixture was cooled back to 25° C and 11.2 grams (.05 moles) of 1-t-butylazo-1-isothiocyanatocyclohexane was added dropwise over 5 minutes. The reaction mixture was stirred for 2 hours at room temperature and then allowed to stand overnight. The next morning the reaction mixture was poured into 200 ml of water and the product extracted with 50 ml pentane. The pentane extract was washed twice with water, once with 10% NaHCO$_3$, dried over anhydrous Na$_2$SO$_4$, filtered and the pentane evaporated under reduced pressure to leave a semi-solid. The semi-solid was slurried in cold pentane and filtered. The filter cake was air dried and weighted 4.0 grams (20% crude yield) and melted at 62°–64° C. The product had a strong band at 1525 cm$^{-1}$ and a sharp NH band at 3300 cm$^{-1}$ in its infrared spectrum.

EXAMPLE LI

Preparation of
2-t-Butylazo-2-(methoxycarbonylamino)propane

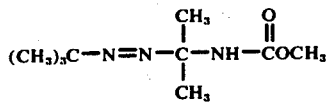

To 50 ml of methanol in a 125 ml erlenmeyer flask stirred with a magnetic stirrer was slowly added 3.1 grams (.075 moles) of 57% sodium hydride. The reaction mixture was cooled back to 25° C and 12.7 grams (.075 moles) of 2-t-butylazo-2-isocyanatopropane (from Example XIV) was added dropwise over 5 minutes. The reaction mixture was stirred for approximately 1 hour, poured into 200 ml water and the product extracted with pentane. The pentane extract was washed with water, 10% NaHCO$_3$ solution, dried over anhydrous Na$_2$SO$_4$, filtered and the pentane evaporated under reduced pressure to leave 11.8 grams (78% crude yield) of a yellow liquid. The product contained a strong carbonyl band at approximately 1740 cm$^{-1}$ and a sharp NH band at approximately 3375 cm$^{-1}$ in its infrared spectrum and there was no isocyanate band at 2225 cm$^{-1}$.

EXAMPLE LII

Preparation of
1,5-Di[1-(t-butylazo-cyclohexylaminocarbonyl]carbohydrazide

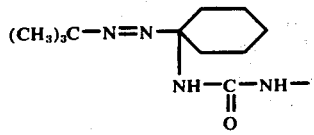

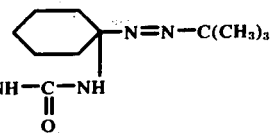

To a slurry of 2.25 grams (.025 moles) of carbohydrazide in 30 ml of methanol stirred by a magnetic stirrer in a 50 ml erlenmeyer flask was added 10.5 grams (.05 moles) of 1-t-butylazo-1-isocyanatocyclohexane (from Example XVIII). The carbohydrazide slowly went into solution over 1 hour. The reaction solution was allowed to stand overnight at room temperature. The next morning the solution was poured into 200 ml water and the product extracted with methylene chloride. The methylene chloride extract was washed with water, dried over anhydrous sodium sulfate, filtered and the methylene chloride evaporated under reduced pressure to leave a sticky solid. The sticky solid was redissolved in pentane and the pentane evaporated under reduced pressure to give a light yellow crystalline solid that weighed 12.0 grams (94% crude yield). The product did not melt sharply but began to decompose around 100° C. The infrared spectrum of the product contained a strong broad carbonyl band at 1660-1700 cm$^{-1}$ and NH bands at 3280-3370 cm$^{-1}$ and the isocyanate band of the starting material was absent.

EXAMPLE LIII

Preparation of
1,5-Di[1-(t-butylazo-1-methylethylaminocarbonyl]-carbohydrazide

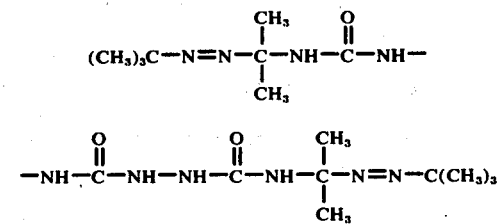

To a slurry of 2.25 grams (.025 moles) of carbohydrazide in 30 ml of methanol stirred by a magnetic stirrer in a 50 ml erlenmeyer flask was added 8.5 grams (.05 moles) of 2-t-butylazo-2-isocyanatopropane (from Example XIV). The carbohydrazide slowly went into solution over 1 hour. The reaction solution was allowed to stand overnight at room temperature. The next morning the solution was poured into water and a white solid formed. The solid was very slightly soluble in methylene chloride so it was filtered off, washed twice with water, with 50 ml methylene chloride and air dried. The white solid weighed 8.1 grams (75% crude yield). The product did not melt sharply but began to decompose around 100° C. The infrared spectrum of the product contained a large broad carbonyl band at 1660–1680 cm$^{-1}$ and NH bands at 3240-3350 cm$^{-1}$ and the isocyanate band of the starting material was absent.

EXAMPLE LIV

Preparation of
1,5-Di[1-(t-butylazo)-cyclohexylaminothiocarbonyl]-carbohydrazide

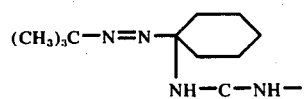

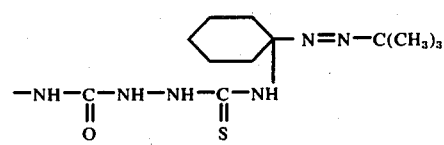

To a slurry of 2.25 grams (.025 moles) of carbohydrazide in 30 ml of methanol stirred by a magnetic stirrer in a 50 ml erlenmeyer flask was added 11.3 grams (.05 moles) of 1-t-butylazo-1-isothiocyanatocyclohexane (from Example I). The reaction was stirred overnight, during which time complete solution was obtained. The next morning the solution was poured into 200 ml water and the product extracted with methylene chloride. The methylene chloride extract was washed with water, dried over anhydrous $Na_2SO_4$, filtered and the methylene chloride evaporated under reduced pressure to leave 11.9 grams (87.5% crude yield) of a yellow viscous liquid that slowly crystallized.

EXAMPLES LV TO LXXXI

Examples LV to LXI in Table I were prepared according to the procedure described in Example I for the preparation of 1-t-butylazo-1-isothiocyanatocyclohexane. The t-alkylhydrazones were prepared from aqueous solutions of t-alkylhydrazines and the desired ketone. The t-alkylhydrazones were converted to the corresponding α-chloroazo by adding an equivalent amount of chlorine to the t-alkylhydrazone in the presence of triethylamine. The α-chloroazos were then reacted with sodium thiocyanate in 75% aqueous isopropanol. The percent yields in Table I are the percent yields for the last step of the sequence, i.e., conversion of the α-chloroazo to the α-isothiocyanatoazo. Table I also indicates the ketone the t-alkylhydrazone was prepared from. The infrared spectra of the products were all consistent with the structure of the desired compounds, i.e. they had strong isothiocyanate bands around 2050 $cm^{-1}$.

Examples LXII to LXVII in Table II were prepared by reacting the corresponding α-isothiocyanato azoalkane from Table I with an amine or hydrazine derivative in pentane. The reactions were stirred at room temperature until an infrared scan of the reaction mixture indicated all of the starting α-isothiocyanato azoalkane had reacted. If the product was an insoluble solid, it was filtered off, washed with cold pentane and dried. If the product was soluble in pentane, the pentane solution was washed with water, 10% $NaHCO_3$ solution, dried, filtered and the pentane evaporated under reduced pressure. The infrared spectra of the products were all consistent with the structure of the desired compounds, i.e. they had strong bands around 1530 $cm^{-1}$ and sharp NH bands around 3200-3300 $cm^{-1}$.

Examples LXVIII to LXXVI in Table III were prepared according to the procedure described in Example XVIII for the preparation of 1-t-butylazo-1-isocyanatocyclohexane, i.e., the corresponding α-chloroazos were reacted with potassium cyanate in 70-75% aqueous isopropanol. In some cases the resulting α-isocyanato azo was reactive enough to react with some of the isopropanol solvent to form a mixture of the desired α-isocyanato azo and the corresponding α-isopropoxycarbonylamino azo. The compounds can be separated by chromatography. However in most cases the α-isocyanato azos were reacted with amines or hydrazine derivatives to form pentane insoluble derivatives (Examples LXXVII to LXXXI in Table IV). The solids were filtered off and dried (see Table IV) and the α-isopropoxycarbonylamino azos were obtained by evaporating the pentane from the filtrate. The infrared spectra of the products were all consistent with the structure of the desired compounds. The α-isocyanato azos all had strong bands around 2225 $cm^{-1}$, the α-isopropoxycarbonylamino azos had strong carbonyl bands around 1725 $cm^{-1}$ and sharp NH bands around 3400 $cm^{-1}$. The α-ureido azos of Table IV had broad strong carbonyl bands around 1625 $cm^{-1}$ and NH bands in the 3300-3400 $cm^{-1}$ region.

TABLE I

α-Isothiocyanato-azoalkanes

| Example No. | Name | Starting Ketone | % Yield |
|---|---|---|---|
| LV | 4:t:Butylazo-4-isothiocyanato-2,6-dimethylheptane | diisobutyl ketone | 95 |
| LVI | allyl 4-t-butylazo-4-isothiocyanatovalerate | allyl levulinate | 72 |
| LVII | 2-t-butylazo-2-isothiocyanato-1-phenylpropane | phenylacetone | 44 |
| LVIII | 3-t-butylazo-3-isothiocyanato-pentane | diethyl ketone | 88 |
| LIX | 1-t-butylazo-1-isothiocyanato-cyclooctane | cyclooctanone | 68 |
| LX | 3-t-butylazo-3-isothiocyanato-1-phenylbutane | benzylacetone | 88 |
| LXI | 1-t-butylazo-1-isothiocyanato-1-cyclopropylethane | methyl cyclopropyl ketone | 47 |

TABLE II

α-Thiourea-azoalkanes

| Example No. | Name cyanato azo | Starting materials α-isothio amine | % Yield |
|---|---|---|---|
| LXII | N-[1-(t-butylazo)-methyl-3-(allyloxycarbonyl)propyl]-N',N'-diethylthiourea | LVI diethylamine | 60 |
| LXIII | N-[1-(t-butylazo)-1-methyl-2-phenylethyl]-N'-isobutylthiourea | LVII isobutylamine | 60 |
| LXIV | N-[1-(t-butylazo)-1-ethyl-propyl]-N',N'-diethyl-thiourea | LVIII diethylamine | 60 |
| LXV | N-[1-(tbutylazo)cyclooctyl]- | LIX n-butylamine | 73 |

TABLE II-continued

α-Thiourea-azoalkanes

| Example No. | Name | | Starting materials | | % Yield |
|---|---|---|---|---|---|
| | | cyanato azo | α-isothio amine | | |
| LXVI | N'-n-butylthiourea N-[1-(t-butylazo)-1-methyl-3-phenylpropyl]-N':cyclohexyl-thiourea | | LX | cyclohexylamine | 76 |
| LXVII | N-[1-(t-butylazo)-1-cyclopropyethyl]-N't-octyl-thiourea | | LXI | t-octylamine | 76 |

TABLE III

α-Carbamate and α-Isocyanato-azoalkanes

| Example No. | Name | Starting Ketone | % Yield |
|---|---|---|---|
| LXVIII | 2-t-butylazo-2-isocyanato-cyclooctane | cyclooctanone | 16 |
| LXIX | 2-t-butylazo-2-(isopropoxycarbonyl-amino)cyclooctane | cyclooctanone | 24 |
| LXX | 3-t-butylazo-3-isocyanatopentane | diethyl ketone | 77 |
| LXXI | n-butyl 4-t-cumylazo-4-isocyanatovalerate | butyl levulinate | 16 |
| LXXII | n-butyl 4-t-cumylazo-4-(isopropoxycarbonylamino)-valerate | butyl levulinate | 42 |
| LXXIII | 4-t-butylazo-4-isocyanato 2,6-dimethylheptane | diisobutyl ketone | 48 |
| LXXIV | allyl 4-t-butylazo-4-isocyanatovalerate | allyl levulinate | 55 |
| LXXV | 3-t-butylazo-3-isocyanato-1-phenylbutane | benzyl acetone | 19 |
| LXXVI | 3-t-butylazo-3-(isopropoxycarbonylamino)-1-phenylbutane | benzyl acetone | 28 |

Table IV

α-Semicarbazide and α-Ureido-azoalkanes

| Example No. | Name | Starting Materials | | % Yield |
|---|---|---|---|---|
| | | α-iso cyanato azo | amine | |
| LXXVII | N-[1-(t-butylazo)-1-methyl-3-phenylpropyl]-N'-t-butylurea | LXXV | t-butylamine | 95 |
| LXXVIII | N-[1-(t-butylazo)cyclo-octyl]-N'-isobutylurea | LXVIII | isobutylamine | 95 |
| LXXIX | N-[1-(t-butylazo)-1-ethylpropyl]-N':iso-butylurea | LXX | isobutylamine | 59 |
| LXXX | N-[1-(t-cumylazo)-1-methyl-3-(n-butoxycarbonyl)-propyl]-N':allylurea | LXXI | allylamine | 95 |
| LXXXI | 4-[1-(t-butylazo)-1-methyl-3-(allyloxycarbonyl)propyl]-1-t-butylsemicarbazide | LXXIV | t-butylhydrazine | 71 |

71 grams (1.0 mole) of chlorine while holding the reaction temperature at −5° to 0° C. After the addition was complete, the reaction solution was stirred an additional 10 minutes at 5° C. The methylene chloride solution was washed with water, 10% NaHCO₃ solution, dried over anhydrous sodium sulfate, filtered and the methylene chloride evaporated under reduced pressure to leave 263 grams (100% crude yield) of white crystals.

B. 1,1'-Azobis (1-isocyanatocyclohexane)

To a solution of 56.8 grams (0.7 moles) of potassium cyanate in 400 ml of 70% aqueous acetone in a 2 liter jacketed reactor equipped with a mechanical stirrer and thermometer, was added a solution of 78.9 grams (0.3 moles) of 1,1'-azobis-(1-chlorocyclohexane) in about 100 ml acetone over a 25 minute period while holding the temperature at 15°–20° C. After the addition was complete, the reaction was stirred an additional 30 minutes at room temperature, diluted with 800 ml water and the product extracted with pentane. The pentane extract was washed with water, 10% NaHCO₃ solution, dried over anhydrous sodium sulfate,

EXAMPLE LXXXII

Preparation of 1,1'-Azobis (1-isocyanatocyclohexane)

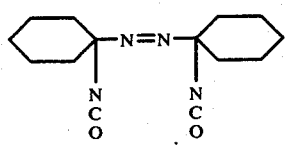

A. 1,1'-Azobis (1-chlorocyclohexane)

To a solution of 192 grams (1.0 mole) of cyclohexanone ketazine in 900 ml methylene chloride in a 2000 ml 4 neck round bottom flash equipped with a mechanical stirrer, gas inlet tube and thermometer was added filtered and the pentane evaporated under reduced pressure to leave 50 grams (61% crude yield) of white crystals m.p. 38°–40° C. The infrared spectrum of the product contained a strong band at 2225 cm⁻¹.

EXAMPLE LXXXIII

Preparation of 1,1'-Azobis [1-(cyclohexylaminocarbonylamino)cyclohexane]

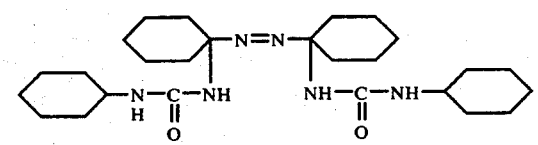

To a stirred solution of 4.22 grams (.0426 moles) of cyclohexylamine in 20 ml pentane in a 125 ml erlenmeyer flask, cooled to 5° C in an ice bath, was slowly added a solution of 5.78 grams (.0213 moles) of 1,1'-azobis (1-isocyanatocyclohexane) in 20 ml of pentane. During the addition, a solid product formed. After the addition was complete, the reaction was stirred an additional 30 minutes at 0°-5° C. The reaction mixture was filtered and the filter cake washed with pentane and dried. The dry while solid weighed 5.4 grams (54% crude yield) and melted at 105°-109° C with decomposition. The infrared spectrum of the product contained a strong carbonyl band at 1655 cm$^{-1}$ and NH bands at 3200 cm$^{-1}$ to 3440 cm$^{-1}$.

EXAMPLE LXXXIV

Preparation of 1,1'-Azobis [1-(phenylhydrazinocarbonylamino)cyclohexane]

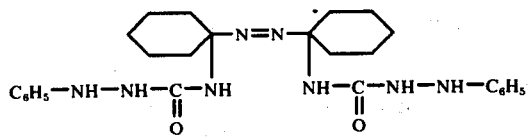

To a stirred solution of 4.52 grams (.041 moles) of phenylhydrazine in 25 ml of pentane in a 125 ml erlenmeyer flask cooled in an ice bath was slowly added a solution of 5.77 grams (.0205 moles) of 1,1'-azobis (1-isocyanatocyclohexane) (from Example XCI) in 25 ml of pentane. After the addition was complete, the reaction was stirred an additional 90 minutes at 0° to 5° C and filtered. The filter cake was washed with cold pentane and air dried. The dry white powder weighed 5.7 grams (57% crude yield) and melted at 148°-151° C with decomposition. The infrared spectrum of the product contained a strong broad carbonyl band at 1670-1700 cm$^{-1}$ and NH peaks at 3200-3340 cm$^{-1}$. The isocyanate band of the starting material at 2225 cm$^{-1}$ was absent.

EXAMPLE LXXXV

Preparation of 1,1'-Azobis [1-(methoxycarbonylamino)cyclohexane]

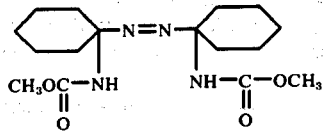

To a stirred solution of 4.77 grams (.0596 moles) of 50% sodium hydroxide in 30 mls of methanol in a 125 ml erlenmeyer flask cooled in an ice bath, was added a solution of 8.1 grams (.0298 moles) of 1,1'-azobis (1-isocyanatocyclohexane) (from Example XCI) in 25 ml of pentane. After the addition was complete, the reaction was stirred an additional 90 minutes at 0°-5° C, diluted with 150 ml cold water and the pentane layer separated. The pentane solution was washed with water, dried over anhydrous Na$_2$SO$_4$, filtered and the pentane evaporated under reduced pressure to leave 3.3 grams (33% crude yield) of a yellow liquid. The infrared spectrum of the product contained a strong sharp carbonyl band at 1730 cm$^{-1}$ and a sharp NH band at 3330 cm$^{-1}$. The isocyanate band of the starting material at 2225 cm$^{-1}$ was absent.

EXAMPLE LXXXVI

Isomerization of 2-t-Butylazo-2-thiocyanatopropane to 2-t-Butylazo-2-isothiocyanatopropane

A. 2-t-Butylazo-2-thiocyanatopropane

To a stirred solution of 9.72 grams (0.12 moles) of sodium thiocyanate in 50 ml methanol in a 125 ml erlenmeyer flask was slowly added 16.25 grams (0.1 mole) of 2-t-butylazo-2-chloropropane while holding the reaction temperature at 5° C with an ice bath. After the addition was complete, the reaction was stirred an additional 15 minutes and poured into 300 ml water. The solids which formed were filtered off and pulled semi-dry on the filter funnel. The crystals were dissolved in pentane, dried over anhydrous sodium sulfate, filtered and the pentane evaporated under reduced pressure. The pale yellow solid residue weighed 8.0 grams (43% crude yield) and melted at 29°-31° C. The infrared spectrum of the product contained a sharp weak band at 2160 cm$^{-1}$. There also was a weak doublet at 2020 and 2070 cm$^{-1}$ indicating there was a trace of the isothiocyanato isomer present.

B. 2-t-Butylazo-2-isothiocyanatopropane

A portion of the above 2-t-butylazo-2-thiocyanatopropane was dissolved in 25 ml pentane and stirred over approximately 2 grams of neutral chromatographic grade aluminum oxide. The isomerization was followed by infrared spectroscopy and after 30 minutes, the isomerization was complete. The aluminum oxide was filtered off and the pentane evaporated from the filtrate to leave a yellow liquid. The infrared spectrum of the product had a broad strong band at 2000-2100 cm$^{-1}$. There was no band at 2160 cm$^{-1}$ indicating the thiocyanato isomer had completely isomerized to the isothiocyanato isomer.

EXAMPLE LXXXVII

Foaming a Polyester Resin with N-[1-t-Butylazo)-1,3-dimethylbutyl]-N'-isobutylthiourea An unsaturated polyester resin was prepared by reacting maleic anhydride (1.0 mole), phthalic anhydride (1.0 mole), and propylene glycol (2.2 moles) until an acid number of 45-50 was obtained. To this was added hydroquinone at 0.013% concentration. Seven parts of this unsaturated polyester were diluted with three parts of monomeric styrene to obtain a homogeneous blend having a viscosity of 21-25 poise and a specific gravity of 1.14.

To 10 grams of the unsaturated polyester resin was added 2 grams of N-[1-(t-butylazo)-1,3-dimethylbutyl]-N'-butylthiourea (from Example XXXVIII) and the mixture stirred for approximately 30 seconds with a mechanical stirrer. The mixture was poured into a glass beaker at ambient temperature (~75° F) and allowed to foam and cure. The foaming and curing were complete in less than 30 minutes and there was a considerable amount of heat generated in the process. After the foam had cooled to room temperature, the foam was cut into a cube with a saw and the foam density determined as 0.65 grams per cubic centimeter.

To 100 grams of the unsaturated polyester resin was added 0.3 grams of 85% phosphoric acid and 2 grams of N-[1-(t-butylazo)-1,3-dimethylbutyl]-N'-isobutyl-thiourea and the mixture stirred as above and poured into a glass beaker to foam and cure. The foam density of this foam was determined to be 0.45 grams per cubic centimeter.

Similar experiments carried out using azobis-(isobutyronitrile), a commercially available azo used as a polyester curing agent, did not foam the polyester resin.

EXAMPLE LXXXVIII

Qualitative Evaluation of the Novel I Compounds as Polyester Foaming Agents

The novel I compounds were qualitatively evaluated as foaming agents for unsaturated polyester resins using the following procedure. The results are tabulated in Table V.

To 100 grams of the unsaturated polyester resin (prepared as in Ex. LXXXVII) were mixed 0.1 gram Lupersol DDM (Lucidol's methyl ethyl ketone peroxide formulation) and the desired number of grams of the I compounds (see column labelled parts azo in Table V) using an electric stirrer. Finally the appropriate number of grams of an activator (if required) (see columns labelled activator and parts activator) was mixed into the formulation. The mixture was poured into a waxed paper cup at ambient temperature (~75° F) and allowed to foam and cure. The foaming and curing were complete in less than 30 minutes. After the foams had cooled to room temperature the foam density was determined (see column labelled foam density).

Note: The activator acetyl sec-hexyl-sulfonyl peroxide is designated as $AH_6SP$ in Table V. This was added as a 50% solution in dimethyl phthalate. The activator acetyl cyclohexylsulfonyl peroxide is designated as ACSP in Table V. This also was added as a 50% solution in dimethyl phthalate. The phosphoric acid used as an activator was 86% by weight.

Table V

| Compound Example No. | Activator | Parts Activator | Parts Azo | Foam Density, g/cc |
|---|---|---|---|---|
| NONE (Control) | — | — | — | 1.25 |
| XXX | $AH_6SP$ | 4 | 2 | 0.62 |
| XXIX | $AH_6SP$ | 4 | 2 | 0.72 |
| I | $AH_6SP$ | 4 | 4 | 0.53 |
| XVIII | None | — | 2 | 0.62 |
| IX | $AH_6SP$ | 4 | 2 | 0.44 |
| XV | $AH_6SP$ | 2 | 2 | 0.80 |
| LXIII | $H_3PO_4$ | 4 | 2 | 0.91 |
| XXII | None | — | 2 | 0.85 |
| XXIII | None | — | 2 | 0.93 |
| XXVI | None | — | 2 | 0.96 |
| XLIV | None | — | 2 | 0.83 |
| LXXVIII | $H_3PO_4$ | 4 | 2 | 0.67 |
| LXXVII | $H_3PO_4$ | 4 | 2 | 1.01 |
| LXXXI | $H_3PO_4$ | 4 | 2 | 0.79 |
| VIII | $AH_6SP$ | 2 | 2 | 0.90 |
| XIII | $H_3PO_4$ | 4 | 2 | 0.95 |
| XXI | None | — | 2 | 0.72 |
| XXV | $H_3PO_4$ | 4 | 2 | 0.85 |

The following compounds are also prepared by procedures analogous to Examples I – LXXXVI above:
1. 2-t-butylazo-2-(methoxythiocarbonylamino)propane
2. 1-t-amylazo-1-isocyanatocyclohexane
3. 1-t-octylazo-1-isothiocyanatocyclohexane
4. 2-(α,α-dimethylnonylazo)-2-isothiocyanatopropane
5. 2-(α,α-dimethyl-γ-phenylpropylazo)-2-(methoxythiocarbonyl-amino)propane
6. 2-[α-methyl-α-ethyl-γ-(para-t-butylphenyl)propylazo]-2-(ethoxycarbonylamino)butane
7. N-{1-[(anthracen-9-yl-1-methyl)ethylazo]-1-methylpropyl}-N'-cyclopentylthiourea
8. N-{1-[1-(α-naphthyl)-1-methylethylazo]1-methylpropyl}-N'-t-butylurea
9. N-[1-(t-methylcyclohexylazo)-1-methylpropyl]-N'-cyclo-hexylthiourea
10. N-[1-(t-methylcyclopentylazo)-1-methylpropyl]-N'-methylurea
11. N-{1-[2-methylnorborn-2-yl]azo-1-methylethyl}-N',N'-pentamethylenethiorea
12. N-[1-(t-methylcyclopropylazo)-1-methylethyl]-N',N'-pentamethyleneurea
13. N-[1-(t-methylcyclodecylazo)-1-methylethyl]-N'-cyclo-propylthiorea
14. N-[1(t-adamantylazo)-1-methylethyl]-N'-cyclopropylurea
15. 2-[(1-cyano-1-methyl)ethylazo]-2-isocyanatopropane
16. 1-[(1-cyano-1-phenyl)ethylazo]-1-phenyl-1-isothiocyanatoethane
17. N-{1-[1-cyano-1-benzyl]propylazo-1-benzylpropyl}-N'-isobutylurea
18. N-[1-(t-butylazo)-1-methylnonyl]thiourea
19. N-[1(t-butylazo)-1,1-dicyclopropylmethyl]urea
20. N-[1-(t-butylazo)-1-cyclohexylethyl]-N'-isobutylurea
21. N-[1-(t-butylazo)-1-cyclododecylethyl]-N'-octyl-thiourea
22. 2-t-butylazo-2-isothiocyanatonorbornane
23. 2-t-butylazo-2-isocyanatoadamantane
24. N-[1(t-butylazo)cyclododecyl]-N'-cyclohexylurea
25. N-[1-(t-butylazo)-1-benzylethyl]-N'-(cyclopropylcarbinyl)-thiourea
26. N-[1-(t-butylazo)-1-methyl-3-(p-t-butylphenyl)propyl]-N'-cyclobutylurea
27. N-[1-(t-butylazo)-1-phenylethyl]thiourea
28. 4-[1-(t-butylazo)-1-(β-naphthyl)ethyl]-1-(p-chlorophenyl)-semicarbazide
29. 4-[1-(t-butylazo)-1-(phenanthren-6-yl)ethyl]-1-(p-bromophenyl)thiosemicarbazide
30. 1-t-butylazo-1-(thiofur-2-yl)-2-isothiocyanatoethane
31. 1-t-butylazo-1-[4-(1,4-pyranyl)]-1-isocyanatoethane
32. 1-t-butylazo-1-isothiocyanatocyclobutane
33. 1-t-butylazo-1-isocyanatocyclododecane
34. 2-t-butylazo-2-isocyanato-4-methoxy-4-methylpentane
35. N-[1-(t-butylazo)-3-phenoxy-1,3-dimethylbutyl-]urea
36. 4-[1-(t-butylazo)-3-ethoxy-1,3-dimethylbutyl]-1-t-butylsemicarbazide
37. N-[1-(t-butylazo)-1-methyl-4-hydroxybutyl]-N'-methylthiourea
38. N-[1-(t-butylazo)-1-methyl-3-carboxypropyl]-N'-ethylurea
39. ethyl 3-t-butylazo-3-isothiocyanotobutyrate
40. N-[1-(t-butylazo)-1-methyl-4-(benzoyloxy)butyl]-N'-isopropylthiourea
41. 4-[1-(t-butylazo)-1-(p-chlorophenyl)ethyl]-1,1-dimethyl-thiosemicarbazide
42. N-[1-(t-butylazo)-1-methyl-4-bromobutyl]-N',N'-dimethylurea
43. 2-t-butylazo-2-(methoxythiocarbonylamino)-5-fluoropentane 44. 1-t-butylazo-1-(p-cyanophenyl)-1-(butoxycarbonylamino)ethane
45. 2-t-butylazo-2-isothiocyanato-1-cyanopentane
46. N-[1-(t-butylazo)-1-methyl-3-(butylaminocarbonyl)propyl]-N'-butylthiourea
47. N-[1-(t-butylazo)-1-methyl-4-(trichloroacetoxy)-butyl]-N'-ethylthiourea
48. 1-t-butylazo-1-[(1-methyl-6-methylsulfonato)-naphth-2-yl]-1-isothiocyanatoethane
49. 1-(α-methyl-α-ethylnonylazo)-1-isothiocyanatocyclohexane
50. 2-t-(3,4-dimethyl)decalylazo-2-isothiocyanatopropane
51. 1-t-butylazo-1-fur-2-yl-1-isocyanatoethane
52. N-[1-(t-butylazo)-1-(tetrahydrofur-2-yl)ethyl]urea
53. 1-t-butylazo-1-(3-methylcyclohexyl)-1-isothiocyanatoethane
54. 1-t-butylazo-1-(pyridin-4-yl)-1-isothiocyanatoethane
55. 2-t-butylazo-2-isothiocyanato-5-(methylsulfonato)-pentane
56. 2-(α-cumylazo)-2-isothiocyanato-1,3-di(ethoxycarbonyl)propane
57. 6-t-amylazo-6-phenyl-6-isothiocyanatocaproic acid
58. 1-t-butylazo-1-isocyanato-1-(anthracen-9-yl)ethane
59. 2t-butylazo-2-isocyanatoindane
60. 2-t-butylazo-2-isocyanatotetralin
61. 1-t-butylazo-1-(pyridin-2-yl)-1-isothiocyanatoethane
62. 2-t-butylazo-2-isothiocyanato-1-acetoxypropane
63. 3,3,13,13-tetramethyl-5,11-dithio-1,2,4,6,10,12-hexaaza-Δ¹-cyclotridecene
64. poly²⁰-1,12-(1,1,4,4-tetramethyl-6,11-dithio-2,3,5,7,10,12-hexaaza-Δ²-dodecenylene)
65. N-[1-(t-butylazo)-1-methylethyl]-N'-dodecylthiourea
66. N-[1-(t-butylazo)-1-methylethyl]-N'-cyclopropylthiourea
67. N-[1-(t-butylazo)-1-methylethyl]-N'-dodecylthiourea
68. N-[1-(t-butylazo)-1-methylethyl]-N'-benzylthiourea
69. N-[1-(t-butylazo)-1-methylethyl]-N'-[2-(para-t-butylphenyl)ethyl]thiourea
70. N-[1-(t-butylazo)-1-methylethyl]-N'-methyl-N'-fur-2-ylurea
71. N-[1-(t-butylazo)-1-methylethyl]-N'-thiophen-2-ylurea
72. N-[1-(t-butylazo)-1-methylethyl]-N'-(4-thiacyclohexyl)urea
73. N-[1-(t-amylazo)-1-methylethyl]-N'-methyl-N'-phenylurea
74. N-[1-(t-butylazo)-1-methylethyl]-N'-phenanthren-3-ylurea
75. N-[1-(t-butylazo)-1-methylethyl]-N'-trimethyleneurea
76. N-[1-(t-butylazo)-1-methylethyl]-N',N'-undecamethyleneurea
77. N-[1-(t-butylazo)-1-methylethyl]-N'-2-(methoxy)ethylthiourea
78. N-[1-(t-butylazo)-1-methylethyl]-N'-2-(phenoxy)ethylthiourea
79. N-[1-(t-butylazo)-1-methylethyl]-N', N'-di(2-hydroxyethyl)thiourea
80. N-[1-(t-butylazo)-1-methylethyl]-N'-6-(carboxy)-hexylthiourea
81. N-[1-(t-butylazo)-1-methylethyl]-N'-6-(methoxycarbonyl)hexylthiourea
82. N-[1-(t-butylazo)-1-methylethyl]-N'-2-(benzoyloxy)ethylthiourea
83. N-[1-(t-butylazo)-1-methylethyl]-N'-methyl-N'-(p-chlorophenyl)thiourea
84. N-[1-(t-butylazo)-1-methylethyl]-N'-methyl-N'-(p-bromophenyl)thiourea
85. N-[1-(t-butylazo)-1-methylethyl]-N'-(o-fluorophenyl)thiourea
86. N-[1-(t-butylazo)-1-methylethyl]-N'-(p-cyanophenyl)thiourea
87. N-[1-(t-butylazo)-1-methylethyl]-N'-[6-(aminocarbonyl)hexyl]thiourea
88. 2-t-butylazo-2-(dodecyloxythiocarbonylamino)-propane
89. 1-t-butylazo-1-cyclopropyl-1-[(dodecylthia)thiocarbonylamino]ethane
90. 3-t-butylazo-3-[(cyclohexylthia)carbonylamino]-pentane
91. 2-t-butylazo-2-(cyclopropyloxy)thiocarbonylaminopropane
92. 2-t-butylazo-2-[(cyclopropylthia)carbonylamino]-propane
93. 4-t-butylazo-2,7-dimethyl-4-[(dodecyloxy)thiocarbonylamino]heptane
94. 1-t-butylazo-4-t-butyl-1-[(dodecylthia)carbonylamino]cyclohexane
95. 1-t-butylazo-2-methyl-1-{[4-(methyl)cyclohexylthia]thiocarbonylamino}cyclohexane
96. 2-t-butylazo-1-[(benzylthia)carbonylamino]propane
97. 2-t-butylazo-2-(benzyloxycarbonylamino)propane
98. 2-t-butylazo-2-[2-(p-t-butylphenyl)ethoxycarbonylamino]propane
99. 2-t-butylazo-3-methyl-2-[(thiophen-2-yl)thiacarbonylamino]butane
100. 3-t-butylazo-2,4-dimethyl-3-[(thiophen-2-yl)oxycarbonylamino]pentane
101. 4-t-butylazo-4-[(4-thiacyclohexyl)oxycarbonylamino]heptane
102. 2-t-butylazo-2-(phenoxycarbonylamino)propane
103. 2-t-butylazo-2-[(napth-2-yl)thiacarbonylamino]-propane
104. 2-t-butylazo-2-[(phenanthren-6-yl)oxythiocarbonylamino]propane
105. 2-t-butylazo-2-[(2-hydroxyethyl)thiacarbonylamino]propane
106. 2-t-butylazo-2-[(2-methoxyethyl)thiacarbonylamino]propane
107. 2-t-butylazo-2-[(2-phenoxyethyl)thiacarbonylamino]propane
108. 2-t-butylazo-2-[(2-carboxyethyl)thiathiocarbonylamino]propane
109. 2-t-butylazo-2-[(2-methoxycarbonyl)ethylthiathiocarbonylamino]propane
110. 2-t-butylazo-2-[(2-benzoyloxy)ethylthiathiocarbonylamino]propane
111. 2-t-butylazo-2-[(p-chlorophenyl)thiacarbonylamino]propane
112. 2-t-butylazo-2-[(p-bromophenyl)thiacarbonylamino]propane
113. 2-t-butylazo-2-[(p-fluorophenoxy)carbonylamino]propane
114. 2-t-butylazo-2-[(p-cyanophenoxy)carbonylamino]propane
115. 2-t-butylazo-2-[2-(aminocarbonyl)ethoxycarbonylamino]propane 116. 1-formyl-4-[1-(t-butylazo)-1-methylethyl]thiosemicarbazide
117. 1-acetyl-4-[1-(t-butylazo)-1-methylethyl]semicarbazide
118. 1-nonoyl-4-[1-(t-butylazo)-1-methylethyl]thiosemicarbazide
119. 1-(cyclopropylcarbonyl)-4-[1-(t-butylazo)-1-methylethyl]thiosemicarbazide
120. 1-(cyclooctylcarbonyl)-4-[1-(t-butylazo)-1-methylethyl]semicarbazide
121. 1-(benzylthiocarbonyl)-4-[1-(t-butylazo)-1-methylethyl]semicarbazide
122. 1-[4-(3,4-dimethylphenyl)butylthiocarbonyl]-4-[1-(t-butylazo-1-methylethyl]thiosemicarbazide
123. 1-(phenylthiocarbonyl)-4-[1-(t-butylazo)-1-methylethyl]semicarbazide
124. 1-(phenanthren-8-ylcarbonyl)-4-[1-(t-butylazo)-1-methylethyl]semicarbazide
125. 1-(4-methoxybutyryl)-4-[1-(t-butylazo)-1-methylethyl]semicarbazide
126. 1-(4-phenoxybutyryl)-4-[1-(t-butylazo)cyclohexyl]thiosemicarbazide
127. 1-(4-hydroxybutyryl)-4-[1-(t-butylazo(cyclohexyl)semicarbazide
128. 1-(3-carboxypropionyl)-4-[1-(t-butylazo)-4-methylethyl]semicarbazide
129. 1-(3-chlorobenzoyl)-4-[1-(t-butylazo)-1-methylethyl]semicarbazide
130. 1-(p-bromobenzoyl)-4-[1-(t-butylazo)-1-methylethyl]semicarbazide
131. 1-(p-cyanobenzoyl)-4-[1-(t-butylazo)-1-methylethyl]semicarbazide
132. 1-methyl-1-(dimethylaminocarbonyl)-4-[1-(t-butylazo)-1-methylethyl]semicarbazide
133. 1-ethyl-1-(aminothiocarbonyl)-4-[1-(t-amylazo)-1-methylethyl]semicarbazide
134. 1-propyl-1-(diethylaminocarbonyl)-4-[1-(t-methylcyclohexylazo)-1-methylpropyl]thiosemicarbazide
135. 1-(isopropylaminothiocarbonyl)-4-[1-(α-cumylazo)cyclohexyl]thiosemicarbazide
136. 2-methyl-4-[1-(t-butylazo)-1-methylpropyl]semicarbazide
137. 2-cyclohexyl-4-[1-(t-butylazo)-1-phenylethyl]semicarbazide
138. 2-dodecyl-4-[1-(t-butylazo)-1-t-butylethyl]thiosemicarbazide
139. 2-isopropyl-4-[1-(t-butylazo)-1-cyclopropylethyl]thiosemicarbazide
140. 2-cyclododecyl-4-[1-(t-amylazo)-1-methylethyl]thiosemicarbazide
141. 2-[2-(hydroxy)ethyl]-4-[1-(t-butylazo)cyclohexyl]thiosemicarbazide
142. 2-[2-(methoxy)ethyl]-4-[1-(t-butylazo)-1-methylethyl]semicarbazide
143. 2-[2-(chloro)ethyl]-4-[1-(t-butylazo)-1-methylethyl]semicarbazide
144. 2-[2-(cyano)ethyl]-4-[1-(t-butylazo)-1-methylethyl]thiosemicarbazide
145. 1-t-octyl-4-[1-(t-butylazo)-1-methylethyl]semicarbazide
146. 1-p-chlorophenyl-4-[1-(t-butylazo)-1-methylethyl]thiosemicarbazide
147. 1-(5-hydroxynaphthyl)-4-[1-(t-butylazo)-1-methylethyl]thiosemicarbazide
148. 1-(5-methoxyphenanthren-8-yl)-4-[1-(t-butylazo)-1-methylethyl]semicarbazide
149. 1-p-fluorophenyl-4-[1-(t-butylazo)-1-methylethyl]semicarbazide
150. 1-p-iodophenyl-4-[1-(1-cyano-1-methyl)ethylazo-1-methylethyl]semicarbazide
151. 1-o-cyanophenyl-4-[1-(t-butylazo)-1-methylethyl]semicarbazide
152. 1-(5-bromonaphth-2-yl)-4-[1-(t-butylazo)-1-methylethyl]thiosemicarbazide
153. 1,1-diethyl-4-[1-(α-cumylazo)-1-phenylpropyl]thiosemicarbazide
154. 1-isopropoxycarbonyl-4-[1-(t-butylazo)-1-methylethyl]semicarbazide
155. 1-methoxythiocarbonyl-4-[1-(1-cyano-1-methyl)ethylazo-1-methylethyl]semicarbazide
156. 1-cyclohexylthiathiocarbonyl-4-[1-(1-cyanocyclohexylazo)cyclohexyl]semicarbazide
157. 1-cyclohexylthiacarbonyl-4-[1-(1-cyano-1-phenyl)ethylazo-1-phenylethyl]semicarbazide
158. 1-methoxythiocarbonyl-4-[1-(t-butylazo)-1-methylpropyl]thiosemicarbazide
159. 1-octylthiathiocarbonyl-4-[1-(t-butylazo)-1-ethylpropyl]thiosemicarbazide
160. 1-dodecylthiacarbonyl-4-[1-(t-butylazo)-1-cyclohexyl-2-methylpropyl]thiosemicarbazide
161. 1,1'-eicosylenebis {3-[(1-cyano-1-methyl)ethylazo]-1-methylethylurea}
162. 1,1'-butylenebis {3-[1-(1-cyano)cyclohexylazocyclohexyl]urea}
163. 2,14-di(t-butylazo)-2,14-dimethyl-3,13-diaza-4,12-dioxo-5,8,11-trioxapentadecane
164. 3,15-di(t-butylazo)-3,15-dimethyl-4,14-diaza-5,13-dithio-6,12-dioxa-9-thiaheptadecane
165. 4,16-di(t-butylazo)-4,16-dimethyl-5,10,15-triaza-6,14-dioxo-7,13-dithianonadecane
166. 2,17-di(t-butylazo)-2,17-dimethyl-3,16-diaza-4,15-dithio-5,8,11,14-tetraoxaoctadecane
167. 1,4-di[N-(1-t-butylazo-1-methylethyl)aminothiocarbonyloxy]-cyclohexane
168. 1,5-di[1-(t-butylazo)-1-methylethylaminocarbonyl]-thiocarbohydrazide
169. 1,5-di[1-(1-cyano-1-methylethylazo)-1-methylethylaminothiocarbonyl]thiocarbohydrazide
170. 2,2,5,5,28,28,31,31-octamethyl-7,10,23,26-tetraoxo-3,4,6,8,9,24,25,27,29,30-decaazadotriaconta-3,29-diene
171. 1,1'-terphthaloyl bis {4-[1-(t-butylazo)cyclohexyl]-thiosemicarbazide}
172. 1,1'-dithiosuccinoyl bis {4-[1-(2-cyanoisopropylazo)-cyclohexyl]semicarbazide}
173. 1,1'-(6,7-dimethylnaphthalene-1,4-dithiocarbonyl)bis {4-[2-(cumylazo)butyl]thiosemicarbazide}
174. N,N'-diethyl-N,N'-di{[1-(t-butylazo)-1-methylethyl]-aminocarbonyl}hydrazine
175. N,N'-tetramethylene-N,N'-di{[1-(1-cyano-1-methylpropylazo)-1-methylpropyl]aminothiocarbonyl}hydrazine
176. 1,1'-[N,N'-dimethyl-N,N'-tetramethylenebiscarbamoyl]-bis {4-[2-(t-butylazo)isopropyl]semicarbazide}
177. 4,4,4',4'-diethylene-1,1'-di{[1-(t-butylazo)-1-methyl-ethyl]aminothiocarbonyl}bis semicarbazide
178. 4,4'-ethylene-1,1'-di{[1-(1-cyano-1-methylethylazo)-1-methyethyl]aminocarbonyl}bis thiosemicarbazide
179. 1,1'-[1,4-tetramethylenedi(oxycarbonyl)]bis{4-[2-(t-butylazo)isopropyl]semicarbazide}

53

180. 1,1'-[4,4'-biphenylenedi(oxycarbonyl)]bis{4-[2-(t-butylazo)-isopropyl]thiosemicarbazide}
181. 1,1'-[1,6-hexamethylenedi(thiooxycarbonyl)-]bis{4-[2-(t-butylazo)isopropyl]semicarbazide}
182. 1,1'-[1,6-hexamethylenedi(thiooxythiocarbonyl)-]bis{4-[1-(t-butylazo)cyclohexyl]thiosemicarbazide}
183. 2-(t-butylazo)-2-methyl-19-{4-[2-(t-butylazo)isopropyl]-aminocarbonylaminophenyl}-4-oxo-3,5-diazanonadecane
184. 2-(t-butylazo)-2-methyl-7-{4-[2-(t-butylazo)isopropyl]-aminocarbonylaminocyclohexyl}4-oxo-3,5-diazaheptane
185. N',N'-oxydiethylene bis{N-[2-(t-butylazo)isopropyl]-thiourea}
186. N',N'-carbonyldioxydiethylene bis{N-[2-(t-butylazo)-isopropyl]thiourea}
187. 2,16-dimethyl-2,16-di(t-butylazo)-4,9,14-trithio-3,5,13,15-tetraaza-8-thiaheptadecane
188. 2,20-dimethyl-2,20-di-(t-butylazo)-4,10,18-triox-o-3,5,9,17,19-pentaazaheneicosane
189. 1,1'-azobis[1-phenyl-1-(cyclohexylaminothiocarbonylamino)-ethane]
190. 1,1'-azobis[1-cyclopropyl-1-(cyclohexyloxycarbonylamino)-ethane]
191. 2,2'-azobis[2-benzoylhydrazinothiocarbonylamino)propane]
192. 2,13-dicarbamoyl-6,9-dimethyl-6,9-diethyl-4,11-dithio-2,3,5,7,8,10,12,13-octaaza-$\Delta^7$-tetradecene
193. 1,1'-azobis[1-(methylaminothiocarbonylhydrazinocarbonyl-amino)cyclohexane]
194. 2,2'-azobis{2-[(N-amino-N-isopropyl)aminocarbonylamino]-pentane}
195. 2,2'-azobis[2-(t-amylhydrazinothiocarbonylamino)-4-methylpentane]
196. 2,2'-azobis{2-[(N-dimethylamino)aminocarbonylamino]-3,3-dimethylbutane}
197. 1,1'-azobis[1-(ethoxycarbonylhydrazinothiocarbonylamino)-1-cyclohexylethane]
198. poly-1,12-(4,4,7,7-tetramethyl-2,9-dioxo-1,3,5,6,8,10-hexaaza-$\Delta^5$-dodecenylene)
199. poly-1,14-(4,4,7,7-tetramethyl-2,9-dithio-1,10-dioxa-3,5,6,8-tetraaza-$\Delta^5$-tetradecenylene)
200. poly-1,13-(8,11-dimethyl-8,11-diethyl-3,13-dioxo-1,2,4,5,7,9,10,12-octaaza-$\Delta^9$-tridecenylene)
201. poly-1,18-(13,13,16,16,-tetraethyl-11,18-dioxo-3,8-dithio-1,2,9,10,12,14,15,17-octaaza-$\Delta^{14}$-octadecenylene)
202. poly-1,10-(5,8-dimethyl-5,8-diethyl-3,10-dithio-1,2,4,6,7,9-hexaaza-$\Delta^6$-decenylene)
203. poly-1,18-(13,13,16,16-tetramethyl-3,8,11,18-tetraoxo-1,2,4,7,9,10,12,14,15,17-decaaza-$\Delta^{14}$-octadecenylene)
204. poly-1,18-(13,13,16,16-tetramethyl-3,8,11,18-tetraoxo-4,7-dioxa-1,2,9,10,12,14,15,17-octaaza-$\Delta^{14}$-octadecenylene)
205. 3,3,12,12-tetramethyl-5,10-dioxo-1,2,4,6,9,11-hexaaza-$\Delta^1$-cyclododecene
206. 4,7-dimethyl-4,7-diethyl-2,9-dioxo-1,10-dioxa-3,5,6,8-tetraaza-$\Delta^5$-cyclotetradecene
207. 4,4-pentamethylene-7,7-pentamethylene-2,9-dioxo-1,10-dithia-3,5,6,8-tetraaza-$\Delta^5$-cyclohexadecene
208. 3,3-pentamethylene-13,13-pentamethylene-8-oxo-5,11-dithio-1,2,4,6,7,9,10,12-octaaza-$\Delta^1$-cyclotridecene

54

209. 3,3-pentamethylene-16,16-pentamethylene-8,11-dioxo-5,14-dithia-1,2,4,6,7,12,13,15-octaaza-$\Delta^1$-cyclohexadecene
210. 3,6,7,10-tetramethyl-3,10-diisobutyl-5,8-dioxo-1,2,4,6,7,9-hexaaza-$\Delta^1$-cyclodecene
211. 3,3-pentamethylene-18,18-pentamethylene-8,13-dixo-5,16-dithio-1,2,4,6,7,9,12,14,15,17-decaaza-$\Delta^1$-cyclooctadecene
212. 12,12-pentamethylene-15,15-pentamethylene-7,10,17,20-tetraoxo-1,6-dioxa-8,9,11,13,14,16,18,19-octaaza-$\Delta^{13}$-cycloeicosene.

What is claimed is:
1. A compound of the formula

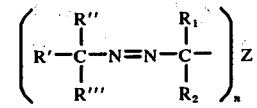

where:
a. $n$ is 1 or 2;
b. R', R'' and R''' are selected from alkyl of 1-8 carbons and and aralkyl of 7-12 carbons, or 2 or more of R', R'' and R''' joined with the tertiary carbon atom to which they are attached form cycloalkyl of 3-12 carbons: or R'' is aryl of 6-14 carbons; or R''' is cyano or Y;
c. $R_1$ and $R_2$ are selected from alkyl of 1-8 carbons, cycloalkyl of 3-12 carbons, aralkyl of 7-12 carbons, or taken together are alkylene of 3-11 carbons; or $R_2$ is aryl of 6-14 carbons;
d. Z, when $n$ is 1, and Y have the same definition and are selected from:

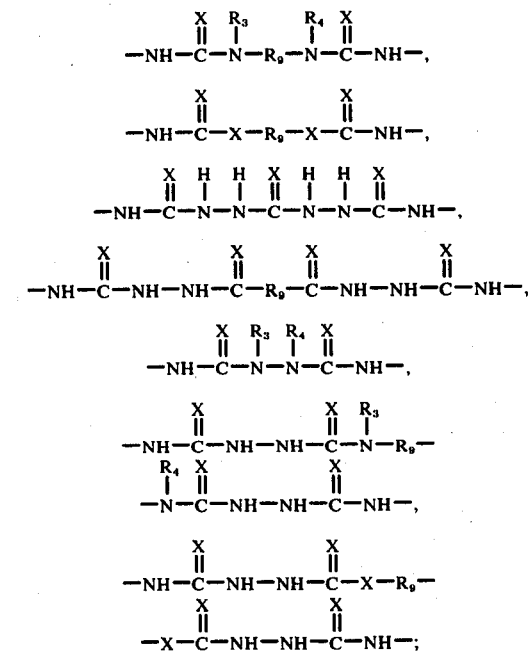

e. X is oxygen or sulfur;
f. $R_3$ and $R_4$ are selected from hydrogen, alkyl of 1-12 carbons, cycloalkyl or 3-12 carbons, aralkyl of 7-12 carbons, aryl of 6-14 carbons and, taken together, alkylene of 3-11 carbons;

g. $R_5$ is selected from alkyl of 1–12 carbons, cycloalkyl of 3–12 carbons, aralkyl of 7–12 carbons and aryl of 6–14 carbons;
h. $R_6$ is selected from hydrogen, alkyl of 1–8 carbons, cycloalkyl of 3–8 carbons, aralkyl of 7–12 carbons and aryl of 6–14 carbons;
i. $R_7$ is selected from primary or secondary alkyl of 1–12 carbons and cycloalkyl of 3–12 carbons;
j. $R_8$ is selected from tertiary alkyl of 4–8 carbons and aryl of 6–14 carbons; and
k. $R_9$ is a hydrocarbyl diradical selected from aliphatic hydrocarbyl of 2–20 carbons, cycloaliphatic hydrocarbyl of 3–20 carbons, aliphatic-cycloaliphatic hydrocarbyl of 4–20 carbons and aromaticaliphatic hydrocarbyl of 7–20 carbons optionally containing one or more nonadjacent and nonterminal oxygen, sulfur or nitrogen atoms in the backbone structure, and from aromatic of 6–12 carbons.

2. A compound as in claim 1 wherein $n$ is 1 and Z is -NCX.

3. A compound as in claim 1, 2-t-butylazo -1-isothiocyanatocyclohexane.

4. A compound as in claim 1, 2-t-butylazo-2-isocyanatopropane.

5. A compound as in claim 1, N-(1-(t-butylazo)cyclohexyl)-N',N'-diethylurea.

6. A compound as in claim 1, 2,2'-azobis(2-isothiocyanato-4-methylpentane).

7. A compound as in claim 1, 2,2'-azobis-(2-isocyanatobutane).

8. A compound as in claim 1, N-(1-(t-butylazo)-1,3-dimethylbutyl)-N'-butylthiourea.

9. A compound as in claim 1, 1-t-butylazo-1-(methoxythiocarbonyl-amino)-cyclohexane.

10. A compound as in claim 1, 2-t-butylazo-2-(methoxycarbonylamino) propane.

* * * * *

UNITED STATES PATENT AND TRADEMARK OFFICE
CERTIFICATE OF CORRECTION

PATENT NO. : 4,028,344
DATED : June 7, 1977
INVENTOR(S) : Harold Carl Lange and Ronald Edward MacLeay It is certified that error appears in the above-identified patent and that said Letters Patent are hereby corrected as shown below:

Column 54, line 36, Claim 1, after "are selected from" insert

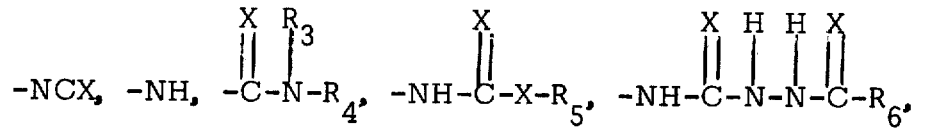

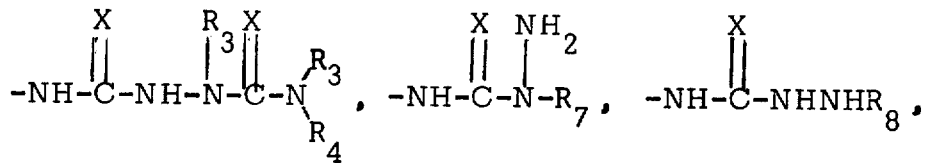

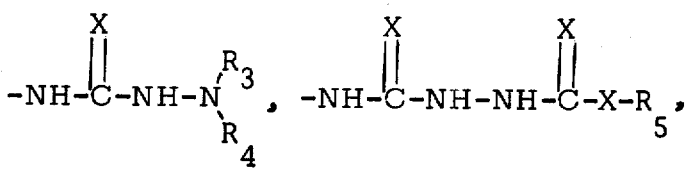

UNITED STATES PATENT AND TRADEMARK OFFICE
CERTIFICATE OF CORRECTION

PATENT NO. : 4,028,344
DATED : June 7, 1977
INVENTOR(S) : Harold Carl Lange and Ronald Edward MacLeay It is certified that error appears in the above-identified patent and that said Letters Patent are hereby corrected as shown below:

and, when n is 2, Z is selected from: --.

Column 54, line 66, Claim 1, "or" should read --of--.

Column 55, line 15, Claim 1, "aromaticaliphatic" should read --aromatic-aliphatic--.

Column 56, line 3, Claim 3, "2-t" should read --1-t--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks